United States Patent
Rico Alvarino et al.

(10) Patent No.: US 11,831,570 B2
(45) Date of Patent: Nov. 28, 2023

(54) REDUNDANCY VERSION CROSS CARRIER INTERLEAVING

(71) Applicant: QUALCOMM Incorporated, San Diego, CA (US)

(72) Inventors: Alberto Rico Alvarino, San Diego, CA (US); Peter Gaal, San Diego, CA (US); Kazuki Takeda, Tokyo (JP); Wanshi Chen, San Diego, CA (US); Mostafa Khoshnevisan, San Diego, CA (US); Ayan Sengupta, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/573,255

(22) Filed: Jan. 11, 2022

(65) Prior Publication Data
US 2023/0224104 A1 Jul. 13, 2023

(51) Int. Cl.
*H04L 5/00* (2006.01)
(52) U.S. Cl.
CPC .......... *H04L 5/0016* (2013.01); *H04L 5/0064* (2013.01)
(58) Field of Classification Search
CPC .................... H04L 5/0016; H04L 5/0064
See application file for complete search history.

(56) References Cited

U.S. PATENT DOCUMENTS

| | | | |
|---|---|---|---|
| 2009/0238066 A1* | 9/2009 | Cheng | H04L 1/0067 714/751 |
| 2012/0087396 A1* | 4/2012 | Nimbalker | H04L 1/1835 375/316 |
| 2013/0021969 A1 | 1/2013 | Ho et al. | |
| 2013/0163543 A1* | 6/2013 | Freda | H04L 5/0092 370/329 |
| 2015/0103752 A1* | 4/2015 | Yu | H04L 49/9005 370/329 |
| 2016/0088635 A1* | 3/2016 | Davydov | H04L 1/1822 370/329 |
| 2017/0034817 A1* | 2/2017 | Park | H04L 5/0082 |

(Continued)

FOREIGN PATENT DOCUMENTS

EP 3378180 B1 11/2020

OTHER PUBLICATIONS

International Search Report and Written Opinion—PCT/US2023/060159—ISA/EPO—dated Apr. 12, 2023.

*Primary Examiner* — Bailor C Hsu
(74) *Attorney, Agent, or Firm* — Holland & Hart LLP

(57) ABSTRACT

Methods, systems, and devices for wireless communications are described. A device may identify a transport block (TB) size for a TB that is scheduled across a set of component carriers (CCs) including a first CC and a second CC. The TB may include a first code block (CB) and a second CB. The device may rate match the TB with the set of CCs. Based on the rate matching, the device may identify redundancy portions of the first CB and redundancy portions of the second CB. The device may allocate a first redundancy portion of the first CB and a first redundancy portion of the second CB to the first CC, and may allocate a second redundancy portion of the first CB and a second redundancy portion of the second CB to the second CC. The device may transmit the TB over the set of CCs based on the allocating.

30 Claims, 9 Drawing Sheets

(56) References Cited

U.S. PATENT DOCUMENTS

| | | | |
|---|---|---|---|
| 2017/0215186 A1* | 7/2017 | Chen | H04L 5/0048 |
| 2018/0035409 A1* | 2/2018 | Chmiel | H04L 1/1835 |
| 2019/0182807 A1* | 6/2019 | Panteleev | H04L 5/0048 |
| 2020/0007275 A1* | 1/2020 | Sarkis | H04L 1/0057 |
| 2021/0075571 A1* | 3/2021 | Manolakos | H04W 72/23 |
| 2021/0384922 A1 | 12/2021 | Ye et al. | |
| 2022/0408470 A1* | 12/2022 | Jung | H04W 72/23 |

* cited by examiner

REDUNDANCY VERSION CROSS CARRIER INTERLEAVING

FIELD OF TECHNOLOGY

The following relates to wireless communications, including redundancy version cross carrier interleaving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices may support carrier aggregation techniques, in which a wireless device may be configured with a set of component carriers (CCs). The set of CCs may be contiguous or non-contiguous in the frequency domain. The wireless device may transmit and receive using one or multiple CCs of the set of CCs. Carrier aggregation may increase available bandwidth for the wireless device, which may improve throughput and reduce latency.

SUMMARY

The described techniques relate to improved methods, systems, devices, and apparatuses that support redundancy version cross carrier interleaving. Generally, the described techniques provide for allocating portions of code blocks (CBs) of a transport block (TB) across a set of component carriers (CCs) on which the TB is scheduled to be transmitted. Such allocations may be configured to provide CC-diversity for each CB in the TB. The allocating may be based on redundancy versions associated with a circular buffer of each CB. For example, a device, such as a user equipment (UE), a base station, or the like, may allocate respective portions of a first CB to each CC of the set of CCs, where each respective portion of the first CB corresponds to a redundancy version of the first CB. More specifically, the device may allocate a first redundancy version (e.g., of the first CB) to a first CC, a second redundancy version to a second CC, and so forth, for each CC in the set of CCs. Additionally, the device may allocate respective portions of a second CB to each CC of the set of CCs, where each respective portion of the second CB corresponds to a redundancy version of the second CB, and so forth, such that each CB of the TB is interleaved across the set of CCs. The device may transmit the transport block over the set of CCs based on the interleaving.

To allocate the portions of each CB to the set of CCs, the device may calculate or otherwise determine a respective quantity of bits and a respective starting bit position in the circular buffer for each redundancy version of each CB. A respective quantity of bits for a redundancy version of a CB may be based on a quantity of available bits of a CC to which the redundancy version is allocated and a size of the TB (e.g., a transport block size (TBS)). In some examples, a respective starting bit position for a redundancy version may be based on a starting bit position and a quantity of bits of a previous redundancy version. In some cases, the device may calculate the TBS based on parameters (e.g., respective ranks, modulation orders, etc.) associated with each CC of the set of CCs.

A method for wireless communications at a wireless device is described. The method may include identifying a TBS for a TB that is scheduled across a set of CCs including a first CC and a second CC, the TB including a first CB and a second CB, rate-matching the TB with the set of CCs, identifying a first set of redundancy portions of the first CB and a second set of redundancy portions of the second CB based on rate-matching the TB, allocating a first redundancy portion of the first CB to the first CC and a second redundancy portion of the first CB to the second CC, allocating a first redundancy portion of the second CB to the first CC and a second redundancy portion of the second CB to the second CC, and transmitting the TB over the set of CCs based on allocating various redundancy portions of the first CB and the second CB to various CCs.

An apparatus for wireless communications at a wireless device is described. The apparatus may include a processor, memory coupled with the processor, and instructions stored in the memory. The instructions may be executable by the processor to cause the apparatus to identify a TBS for a TB that is scheduled across a set of CCs including a first CC and a second CC, the TB including a first CB and a second CB, rate-match the TB with the set of CCs, identify a first set of redundancy portions of the first CB and a second set of redundancy portions of the second CB based on rate-matching the TB, allocate a first redundancy portion of the first CB to the first CC and a second redundancy portion of the first CB to the second CC, allocate a first redundancy portion of the second CB to the first CC and a second redundancy portion of the second CB to the second CC, and transmit the TB over the set of CCs based on allocating various redundancy portions of the first CB and the second CB to various CCs.

Another apparatus for wireless communications at a wireless device is described. The apparatus may include means for identifying a TBS for a TB that is scheduled across a set of CCs including a first CC and a second CC, the TB including a first CB and a second CB, means for rate-matching the TB with the set of CCs, means for identifying a first set of redundancy portions of the first CB and a second set of redundancy portions of the second CB based on rate-matching the TB, means for allocating a first redundancy portion of the first CB to the first CC and a second redundancy portion of the first CB to the second CC, means for allocating a first redundancy portion of the second CB to the first CC and a second redundancy portion of the second CB to the second CC, and means for transmitting the TB over the set of CCs based on allocating various redundancy portions of the first CB and the second CB to various CCs.

A non-transitory computer-readable medium storing code for wireless communications at a wireless device is described. The code may include instructions executable by a processor to identify a TBS for a TB that is scheduled across a set of CCs including a first CC and a second CC, the TB including a first CB and a second CB, rate-match the TB with the set of CCs, identify a first set of redundancy portions of the first CB and a second set of redundancy portions of the second CB based on rate-matching the TB, allocate a first redundancy portion of the first CB to the first CC and a second redundancy portion of the first CB to the second CC, allocate a first redundancy portion of the second CB to the first CC and a second redundancy portion of the second CB to the second CC, and transmit the TB over the set of CCs based on allocating various redundancy portions of the first CB and the second CB to various CCs.

Some examples of the method, apparatuses, and non-transitory computer-readable medium described herein may further include operations, features, means, or instructions for identifying, for the first CC, a first quantity of bits allocated to the first CB and a second quantity of bits allocated to the second CB based on a quantity of CBs of the TB and a quantity of available bits of the first CC and identifying, for the second CC, a third quantity of bits allocated to the first CB and a fourth quantity of bits allocated to the second CB based on the quantity of CBs of the TB, the quantity of available bits of the first CC, and the quantity of available bits of the second CC, where identifying the first set of redundancy portions of the first CB and the second set of redundancy portions of the second CB may be based on identifying the first quantity of bits, the second quantity of bits, the third quantity of bits, and the fourth quantity of bits.

In some examples of the method, apparatuses, and non-transitory computer-readable medium described herein, the first redundancy portion of the first CB may be based on the first quantity of bits of the first CC allocated to the first CB, the first redundancy portion of the second CB may be based on the second quantity of bits of the first CC allocated to the second CB, the second redundancy portion of the first CB may be based on the third quantity of bits of the second CC allocated to the first CB, and the second redundancy portion of the second CB may be based on the fourth quantity of bits of the second CC allocated to the second CB.

Some examples of the method, apparatuses, and non-transitory computer-readable medium described herein may further include operations, features, means, or instructions for identifying a first starting bit position for the first redundancy portion of the first CB, where allocating the first redundancy portion of the first CB to the first CC may be based on the first starting bit position and the first quantity of bits of the first CC allocated to the first CB and identifying a second starting bit position for the second redundancy version of the first CB based on the first starting bit position of the first redundancy portion of the first CB and the first quantity of bits of the first CC allocated to the first CB, where allocating the second redundancy portion of the first CB to the second CC may be based on the second starting bit position and the third quantity of bits of the second CC allocated to the first CB.

Some examples of the method, apparatuses, and non-transitory computer-readable medium described herein may further include operations, features, means, or instructions for identifying a third starting bit position for the first redundancy portion of the second CB, where allocating the first redundancy portion of the second CB to the first CC may be based on the third starting bit position and the second quantity of bits of the first CC allocated to the second CB and identifying a fourth starting bit position for the second redundancy portion of the second CB based on the third starting bit position of the first redundancy portion of the second CB and the second quantity of bits of the first CC allocated to the second CB, where allocating the second redundancy portion of the second CB to the second CC may be based on the fourth starting bit position and the fourth quantity of bits of the second CC allocated to the second CB.

Some examples of the method, apparatuses, and non-transitory computer-readable medium described herein may further include operations, features, means, or instructions for identifying a first starting bit position for the second redundancy portion of the first CB allocated to the second CC and identifying a second starting bit position for the second redundancy version of the second CB allocated to the second CC, where an index value of the first starting bit position may be different than an index value of the second starting bit position, where allocating the second redundancy portion of the first CB and the second redundancy portion of the second CB to the second CC may be based on the first starting bit position and the second starting bit position.

Some examples of the method, apparatuses, and non-transitory computer-readable medium described herein may further include operations, features, means, or instructions for applying a rounding function to a first ending bit position for the first redundancy portion of the first CB allocated to the first CC, the rounding function associated with a lifting factor associated with the TB, identifying a first starting bit position for the second redundancy portion of the first CB allocated to the second CC based on applying the rounding function to the first ending bit position for the first redundancy portion of the first CB allocated to the first CC, applying the rounding function to a second ending bit position for the first redundancy portion of the second CB allocated to the first CC, the rounding function associated with the lifting factor associated with the TB, and identifying a second starting bit position for the second redundancy version of the second CB allocated to the second CC based on applying the rounding function to the second ending bit position for the first redundancy portion of the second CB allocated to the first CC, where allocating the second redundancy portion of the first CB and the second redundancy portion of the second CB to the second CC may be based on the first starting bit position and the second starting bit position.

Some examples of the method, apparatuses, and non-transitory computer-readable medium described herein may further include operations, features, means, or instructions for identifying a first adjustment factor for the first CC, identifying, for the first CC, a first quantity of bits allocated to the first CB and a second quantity of bits allocated to the second CB based on the first adjustment factor, identifying a second adjustment factor for the second CC, and identifying, for the second CC, a third quantity of bits allocated to the first CB and a fourth quantity of bits allocated to the second CB based on the second adjustment factor, where allocating redundancy portions to the first CC and the second CC may be based on the identifying the first quantity of bits, the second quantity of bits, the third quantity of bits, and the fourth quantity of bits.

Some examples of the method, apparatuses, and non-transitory computer-readable medium described herein may include further operations, features, means, or instructions for adjusting a starting CB for the second CC based on allocating the first redundancy portion of the first CB before allocating the first redundancy portion of the second CB to the first CC, where allocating redundancy portions to the second CC further includes allocating a third quantity of bits of the second CC to the second redundancy portion of the second CB before allocating a fourth quantity of bits of the second CC the second redundancy portion of the first CB.

Some examples of the method, apparatuses, and non-transitory computer-readable medium described herein may further include operations, features, means, or instructions for estimating a quantity of resource elements associated with the first CC based on the TBS, identifying a first starting bit position for the second redundancy portion of the first CB allocated to the second CC based on the quantity of resource elements, and identifying a second starting bit position for the second redundancy portion of the second CB allocated to the second CC based on the quantity of resource elements, where allocating the second redundancy portion of the first CB and the second redundancy portion of the second CB to the second CC may be based on the first starting bit position and the second starting bit position.

In some examples of the method, apparatuses, and non-transitory computer-readable medium described herein, a quantity of resource elements associated with each CC of the set of CCs may be equal.

In some examples of the method, apparatuses, and non-transitory computer-readable medium described herein, the first starting bit position and the second starting bit position may be the same and may be identified based on a quantity of bits per CB of the set of CBs.

Some examples of the method, apparatuses, and non-transitory computer-readable medium described herein may further include operations, features, means, or instructions for identifying the TBS may be based on a respective modulation order, quantity of layers, quantity of resource elements, and coding rate for each CC of the set of CCs.

Some examples of the method, apparatuses, and non-transitory computer-readable medium described herein may further include operations, features, means, or instructions for identifying the TBS may be based on a respective maximum modulation order, maximum quantity of layers, quantity of resource elements, and coding rate for each CC of a set of multiple CCs including the set of CCs and a quantity of configured CCs.

In some examples of the method, apparatuses, and non-transitory computer-readable medium described herein, a quantity of bits in a redundancy portion may be based on a quantity of CCs of the set of CCs and a quantity of CBs of the TB.

Some examples of the method, apparatuses, and non-transitory computer-readable medium described herein may further include operations, features, means, or instructions for ordering each CC of the set of CCs based on a respective CC index, a respective modulation order, or a combination thereof, where allocating redundancy portions to the set of CCs may be based on the ordering.

DETAILED DESCRIPTION

Figure 1:
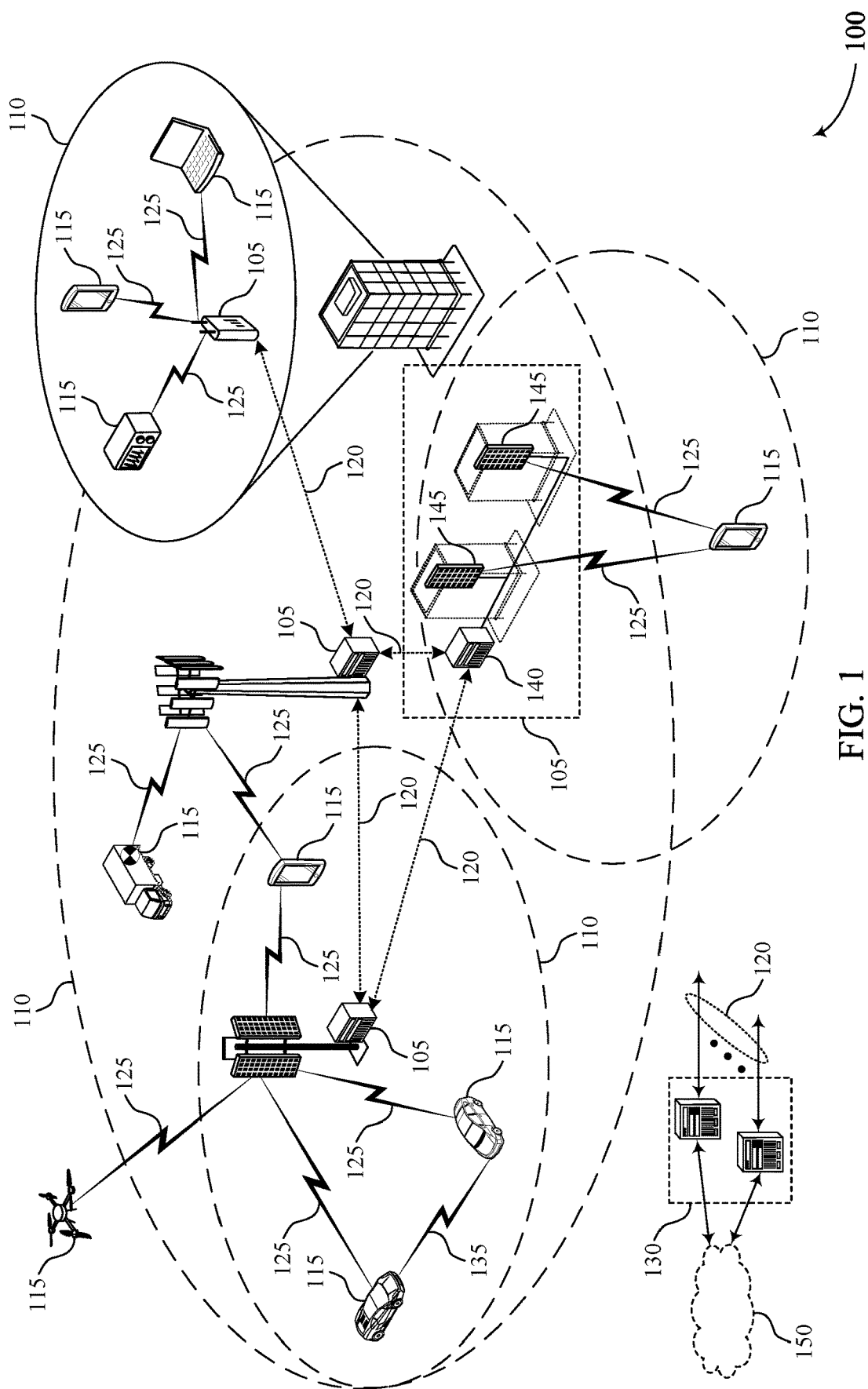
FIG. 1 illustrates an example of a wireless communications system that supports redundancy version cross carrier interleaving in accordance with aspects of the present disclosure.

In some wireless communications systems, a wireless device (e.g., a user equipment (UE), a base station) may support carrier aggregation, in which the wireless device is configured with a set of component carriers (CCs). The configured CCs may be contiguous or non-contiguous in the frequency domain, e.g., in the same or different frequency bands. The wireless device may transmit and receive via one or multiple CCs. For example, the wireless device may be scheduled to transmit a transport block (TB) across a set of the configured CCs. The TB may be segmented into code blocks (CBs), and the wireless device may transmit subsets of the CBs on each CC. In some cases, the wireless device may allocate CBs to CCs in accordance with a mapping scheme, for instance, in an order based on a frequency of each CC, an index of each CC, or the like.

However, if the CBs are not evenly distributed across the set of CCs, the transmission may lack redundancy and reliability. For example, one CC of the set of CCs may experience interference or blockages, such that a receiving device may fail to receive the subset of CBs transmitted on that CC. If a CB was only transmitted on that CC (e.g., was not transmitted on any other CCs of the set of CCs), the CB may be unrecoverable. In some cases, failure to recover a CB may result in failure to successfully receive the entire TB.

Various aspects of the present disclosure support increased diversity for transmitting a TB across multiple CCs, which may improve communication reliability. A transmitting device may interleave CBs of the TB across the CCs based on redundancy versions associated with each CB. For example, the transmitting device may allocate a portion of each CB to each CC in a set of CCs, such that at least one portion of each CB is transmitted on more than one CC. More specifically, the transmitting device may allocate at least a portion of each CB to each of the CCs of the set of CCs. The portions of the CBs may correspond to redundancy versions of a circular buffer of the CB. Accordingly, if a receiving device experiences interference while attempting to receive the transmission via a specific CC, portions of the CB transmitted on other CCs in the set of CCs may provide sufficient information for the receiving device to recover the CB and/or the entire TB. As different CCs may have different characteristics and may experience different channel conditions, increasing diversity by transmitting repetitions of CBs on more than one CC of a set of CCs may significantly improve the likelihood that the receiving device is able to successfully receive and decode the TB.

For example, the transmitting device may store, in a circular buffer for a first CB, a set of redundancy versions of the first CB that are based on rate matching encoded bits corresponding to the TB to the set of CCs. The transmitting device may allocate a first redundancy version of the first CB to a first CC, a second redundancy version of the first CB to a second CC, and so forth, for the set of CCs. In a circular buffer for a second CB, the transmitting device may store a set of redundancy versions of the second CB. The transmitting device may allocate a first redundancy version of the second CB to the first CC, a second redundancy version of the second CB to the second CC, and so on. In this manner, each CC of the set of CCs may carry a respective redundancy version of each CB.

In some examples, each CC in the set of CCs may be configured with different parameters, such as a modulation order, rank, resource allocation, or the like. Accordingly, the transmitting device may calculate a transport block size (TBS) for the TB based on parameters associated with every CC in the set of CCs. Additionally, to efficiently allocate the CB portions (e.g., the redundancy versions) to each CC, the transmitting device may identify or otherwise calculate starting points (i.e., starting bit positions) and lengths (i.e., quantities of bits) for redundancy versions in the one or more CCs. For instance, a redundancy version of a CB may include a quantity of bits that is based a quantity of available bits of the CC to which the redundancy version is allocated and the TBS.

Aspects of the present disclosure may be implemented to realize one or more of the following potential advantages or improvements, among others. The present disclosure may provide benefits and enhancements to the operation of a wireless device. For example, by configuring the wireless device to transmit and receive TBs using redundancy version cross carrier interleaving, the wireless device may communicate with increased reliability. More specifically, the TBs may be associated with higher frequency diversity. Such frequency diversity may allow the wireless device to mitigate frequency-dependent interference. As a result, the wireless device may communicate with increased spectral efficiency, reliability, and robustness.

Aspects of the disclosure are initially described in the context of wireless communications systems. Aspects of the disclosure are then described with reference to interleaving schemes and circular buffers. Aspects of the disclosure are further illustrated by and described with reference to apparatus diagrams, system diagrams, and flowcharts that relate to redundancy version cross carrier interleaving.

FIG. 1 illustrates an example of a wireless communications system 100 that supports redundancy version cross carrier interleaving in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a device, such as a UE 115, that supports carrier aggregation in the wireless communications system 100 may be configured with multiple CCs for communications with one or more other devices (e.g., base stations 105, UEs 115). Each CC may be configured with a set of parameters, which may include, but is not limited to, a modulation order, a quantity of layers (i.e., a rank), a resource allocation (e.g., a time domain resource allocation (TDRA), a frequency domain resource allocation (FDRA)), or the like. Additionally, for a given transmission, a CC may have a quantity of available channel bits that is based on the corresponding configuration.

The UE 115 may receive scheduling information, such as a grant, from a base station 105 indicating that a TB is scheduled across a subset of the configured CCs. A TB may refer to data passed down from an upper layer (e.g., from a MAC layer) down to a lower layer (e.g., to a physical layer (PHY)) for transmission. The UE 115 may segment the TB into a set of CBs and may determine a TBS based on the configured parameters of each CC in the subset of CCs. To improve the reliability of the TB, the UE 115 may interleave portions of each CB across the subset of CCs such that the base station 105 may receive the TB with relatively high frequency diversity. For example, the UE 115 may allocate, to each CC of the subset of CCs, portions of a CB that correspond to redundancy versions of a circular buffer of the CB. Accordingly, the higher frequency diversity associated with transmitting each of the CBs in multiple CCs may reduce adverse effects of interference on such communications between the base station 105 and the UE 115.

The UE 115 may generate a set of redundancy versions of each CB, which may be stored in a circular buffer that corresponds to the CB. As used herein, the term "redundancy version" may refer to a specific encoding of the transmission according to an incremental redundancy scheme. In some examples, a redundancy version may be referred to as a redundancy portion. Each set of redundancy versions may be generated based on rate matching encoded bits corresponding to the TB with the set of CCs. In some examples, a portion of the circular buffer that is allocated to a CB may be referred to herein as a "redundancy portion," and may correspond to a redundancy version of a set of redundancy versions. For each CB, the UE 115 may allocate respective redundancy portions to each CC of the set of CCs. For example, for a first CB corresponding to a first set of redundancy portions, the UE 115 may allocate a first redundancy portion to a first CC, a second redundancy portion to a second CC, a third redundancy portion to a third CC, and so on. For a second CB corresponding to a second set of redundancy portions, the UE 115 may allocate a first redundancy portion to the first CC, a second redundancy portion to the second CC, a third redundancy portion to the third CC, and so on. The UE 115 may transmit the TB over the set of CCs based on the allocating.

Figure 2:
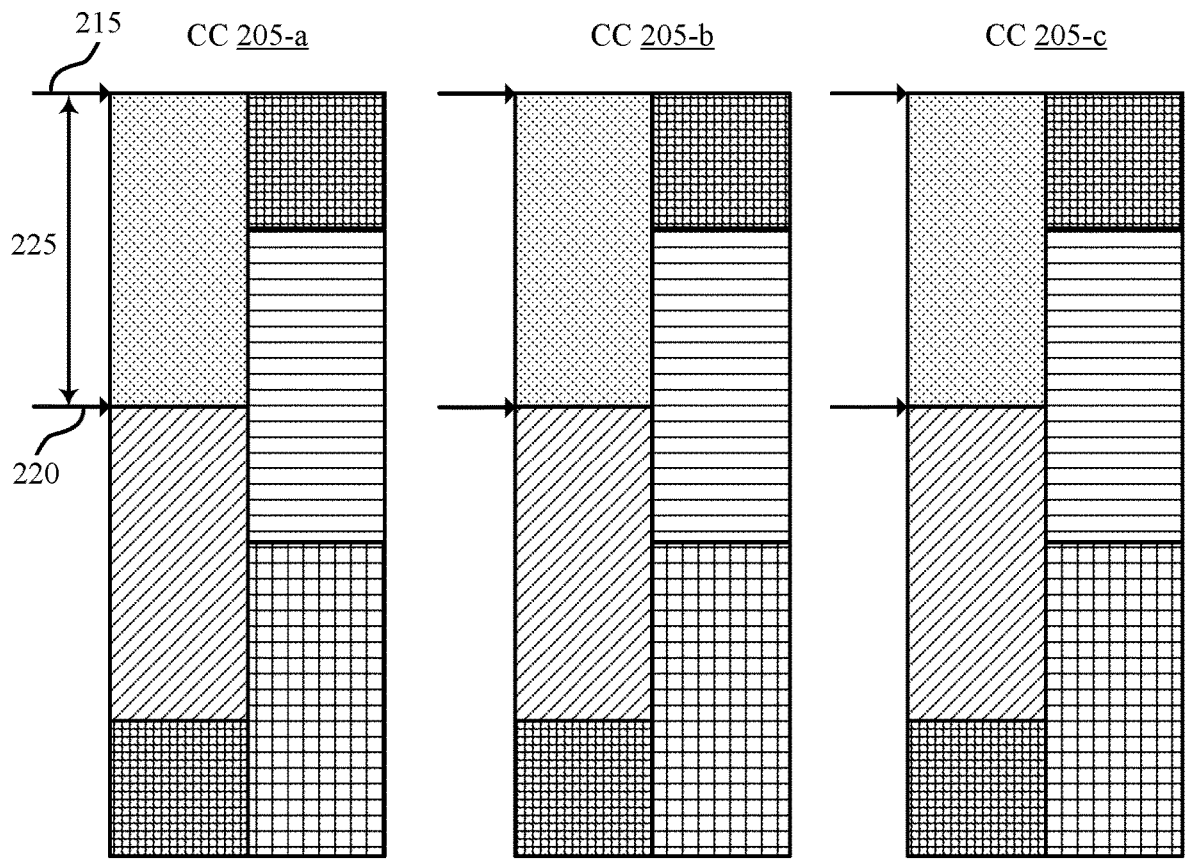
FIG. 2 illustrates an example of an interleaving scheme that supports redundancy version cross carrier interleaving in accordance with aspects of the present disclosure.

FIG. 2 illustrates an example of an interleaving scheme 200 that supports redundancy version cross carrier interleaving in accordance with aspects of the present disclosure. The interleaving scheme 200 may implement aspects of the wireless communications system 100 or may be implemented by aspects of the wireless communications system 100 as described herein with reference to FIG. 1. For example, a device, such as a base station 105, a UE 115, or the like, may implement the interleaving scheme 200 to transmit a TB across a set of CCs 205 in accordance with the techniques described herein. The interleaving scheme 200 may support transmission of a TB with higher diversity (e.g., CC diversity or frequency diversity) and enhanced reliability, among other benefits.

In some wireless communications systems, a device may be configured with multiple CCs. The device may transmit and receive over one or more of the configured CCs, which may be in the same or different frequency bands, and may be contiguous or non-contiguous. The device may receive scheduling information per CC. In some cases, the device may support cross carrier scheduling, in which the device receives control information (e.g., downlink control information (DCI)) on a first CC that schedules downlink or uplink transmissions on one or more CCs, which may be the same as or different than the first CC. Additionally, or alternatively, the device may transmit or receive over multiple scheduled CCs simultaneously.

In some cases, some or all of the configured CCs may have different configurations and parameters, which may be indicated in the corresponding scheduling information. For example, each CC may be configured with a modulation order, quantity of layers (i.e., a rank), resource allocation (e.g., TDRA, FDRA), bandwidth, demodulation reference signal (DMRS) pattern, overhead, numerology, or the like. While supporting multiple CCs may increase an available bandwidth for the device, thereby improving throughput and efficiency, each CC having a different configuration may increase complexity in processing (e.g., baseband processing) at the device. For example, the device may receive scheduling information, including a resource allocation and any additional parameters, for a transmission scheduled over a CC. The CC may have a quantity of available resources (e.g., available channel bits) for the transmission that is based on the corresponding configuration and parameters.

For example, the DMRS pattern, overhead, and resource allocation (e.g., as indicated by scheduling information, such as DCI) for a transmission (e.g., a physical downlink shared channel (PDSCH) transmission) scheduled over a CC may impact a quantity of available resource elements (REs) in a resource block (e.g., a physical resource block (PRB)) for the transmission. Put another way, a CC may have a quantity of resource elements per resource block $N'_{RE}$ available for a scheduled data transmission. This quantity of resource elements $N'_{RE}$ may be based on a quantity of subcarriers per resource block $N_{sc}^{RB}$, a TDRA (e.g., a quantity of symbols) $N_{symb,c}^{sh}$ for the transmission, a quantity of DMRS resource elements per resource block $N_{DMRS,c}^{PRB}$, and a quantity of overhead resource elements per resource block $N_{oh,c}^{PRB}$. In some examples, the quantity of overhead resource elements per resource block $N_{oh,c}^{PRB}$ may be a reference value (e.g., rather than an actual value). The device may calculate $N'_{RE}$ for a CC using Equation 1 below.

$$N'_{RE,c} = N_{sc}^{RB} N_{symb,c}^{sh} - N_{DMRS,c}^{PRB} - N_{oh,c}^{PRB} \qquad (1)$$

In some examples, if the quantity of available resource elements per resource block $N'_{RE}$ is greater than 156, the device may round down the value of $N'_{RE}$ to be equal to 156. That is, the device may assume that a single resource block has a maximum allocation of 156 resource elements (e.g., within a bandwidth of the resource block). To determine a total quantity of available resource elements $N_{RE,c}$ of the CC, the device may identify a quantity of allocated resource blocks $n_{PRB,c}$ (e.g., based on an FDRA), and may multiply the quantity of available resource elements per resource block $N'_{RE}$ by the quantity of allocated resource blocks $n_{PRB,c}$. This calculation is shown in Equation 2 below.

$$N_{RE,c} = \min(156, N'_{RE}) n_{PRB,c} \qquad (2)$$

The device may identify and encode a TB corresponding to the transmission before mapping the TB onto the CC for transmission. The device may calculate a TBS, in bits, for the TB, based on the CC. Here, the device may convert the total quantity of available resource elements $N_{RE,c}$ (e.g., as calculated by Equation 2) into a quantity of available information bits $N_{info}$, which depends on a coding rate R, a modulation order $Q_{m,c}$, and a rank $v_c$ of the CC. The device may calculate $N_{info}$ using Equation 3 below.

$$N_{info} = R Q_{m,c} v_c N_{RE,c} \quad (3)$$

From $N_{info}$, the device may determine or otherwise identify (e.g., based on a lookup table, an algorithm, etc.) the TBS for the TB. The TB may be encoded, and the encoded bits corresponding to the TB may be rate matched. In some examples (e.g., based on the TBS), the device may segment the TB into a set of CBs and may add cyclic redundancy check (CRC) bits associated with each CB. Each CB may include a respective set of bits, and each CB (i.e., each respective set of bits) may be separately encoded at a given coding rate (e.g., based on the coding scheme, such as LDPC, turbo coding, or the like). Coded bits of a CB (i.e., coded bits corresponding to a CB) may include both systematic bits (e.g., information bits) and parity bits. The device may rate match the encoded bits corresponding to the CBs, which may include performing subblock interleaving, bit collection, and bit selection and pruning. After rate matching, the device may concatenate the CBs and store them in a buffer (e.g., a circular buffer). To transmit the TB, the device may map (i.e., allocate) the rate matched CBs (i.e., encoded, rate matched bits corresponding to the CBs) from the buffer to the resource elements of the CC.

In some cases, the quantity of available resource elements $N_{RE,c}$ of the CC may be different than an actual quantity of resource elements that the device may use for the transmission. For example, the CC may have a quantity of overhead bits that is different than a reference value used for $N_{oh,c}^{PRB}$ or $N_{RE,c}$ may be adjusted for rate matching, etc. Accordingly, the device may calculate a total quantity of available channel bits $b_c$ of the CC using Equation 4, where $N_{RE\_actual}$ represents the actual quantity of resource elements.

$$b_c = Q_{m,c} v_c N_{RE\_actual} \quad (4)$$

In some examples, the device may rate match the coded bits corresponding to the TB (e.g., corresponding to the CBs of the TB) to fit within the REs of the CC that are allocated and available for the transmission. That is, when mapping the TB (e.g., coded bits of the TB) from the buffer to the CC resource elements, the device may add or remove bits of the TB to align with the quantity of available bits $b_c$ of the CC. For example, if the quantity of coded bits corresponding to the TB is greater than the quantity of available bits $b_c$, the device may puncture (e.g., discard) some of the coded TB bits; if the quantity of coded bits corresponding to the TB is less than $b_c$, the device may repeat some of coded the TB bits. Additionally, or alternatively, the device may perform rate matching to achieve a desired code rate, which may be different than an effective code rate of the TB.

In some cases, the device may transmit a TB over multiple CCs. The device may calculate a respective size of TB for each CC for which a TB is scheduled, e.g., based on the parameters corresponding to each CC, and may separately transmit the TB on each CC according to the respective size. Alternatively, the device may map CBs (e.g., encoded bits corresponding to CBs) of the TB across multiple CCs. For example, the device may map CBs across a set of CCs on a CC-first basis (e.g., in an order corresponding to CC indexes). Here, the device may allocate CBs to a first CC based on the available resources of the first CC. When CBs have been allocated to all available resources of the first CC, the device may begin allocating CBs to available resources of the second CC, and so forth, until the entire TB has been mapped. Alternatively, the device may map CBs to the set of CCs on a frequency-first basis (e.g., in an order corresponding to frequencies of the CCs). In this example, the device may allocate CBs to available frequency resources, for instance, from a lowest frequency to a highest frequency, or vice versa.

However, if bits corresponding to respective CBs are not evenly distributed across the set of CCs, the transmission may lack redundancy and reliability. For example, a frequency band associated with a first CC of the set of CCs may experience attenuation or loss, e.g., due to interference, blockages, or the like, such that a receiving device may fail to receive transmissions over the first CC. The receiving device may therefore fail to receive any CBs of the TB that were transmitted via the first CC. If a CB was only transmitted over the first CC (e.g., was not transmitted over any other CCs of the set of CCs), the receiving device may be unable to recover information associated with the CB. In some cases, failure to recover a CB may result in failure to successfully receive the entire TB.

To improve communications reliability and efficiency, the device may increase diversity (e.g., CC diversity or frequency diversity) by transmitting the TB across the set of CCs using redundancy version cross carrier interleaving. As illustrated in FIG. 2, the TB may be scheduled across a set of CCs 205-a, 205-b, and 205-c. In accordance with the techniques described herein, the device may map CBs 210 of the TB across the CCs 205 such that a portion of each CB 210 may be transmitted on every CC 205. A portion of a CB 210 may refer to a portion of bits of a set of encoded bits that corresponds to the CB 210. Put another way, and as described in more detail with reference to FIG. 3, a portion of a CB 210 may correspond to a redundancy version of a circular buffer of the CB 210, and may have a starting bit 215, an ending bit 220, and a quantity of bits 225.

For example, the device may allocate a first portion of CB 210-a to CC 205-a, a second portion of CB 210-a to CC 205-b, and a third portion of CB 210-a to CC 205-c. The first portion may correspond to a first redundancy version of the CB 210-a, the second portion may correspond to a second redundancy version of the CB 210-a, and the third portion may correspond to a third redundancy version of the CB 210-a. Likewise, the device may allocate a first portion of CB 210-b to CC 205-a, a second portion of CB 210-b to CC 205-b, and a third portion of CB 210-b to CC 205-c; the device may allocate portions of each CB 210 to each CC 205 for every CB 210 of the TB. The device may therefore transmit the TB with improved frequency diversity. For example, a receiving device may experience interference over a CC 205, such as CC 205-a, and may fail to receive or successfully decode the portion of CB 210-a transmitted over CC 205-a. However, the receiving device may successfully receive CCs 205-b and 205-c, and the portions (i.e., redundancy versions) of CB 210-a mapped to CCs 205-b and 205-c may provide sufficient information for the receiving device to recover and decode the TB.

As each CC 205 may be configured differently, each CC 205 may have a different resource allocation and/or different parameters. To account for these varying parameters when transmitting the TB over the CCs 205, the device may calculate a TBS that is based on the parameters for every CC 205 in the set of CCs 205 using Equation 5 below.

$$N_{info} = R \Sigma_{c=1}^{N} Q_{m,c} v_c N_{RE,c} \quad (5)$$

For example, the coding rate R may be the same for each CC 205, but the quantity of available resource elements $N_{RE,c}$ (e.g., as calculated by Equation 2), the modulation order $Q_{m,c}$, and the rank $v_c$ may be different. Accordingly, the device may use Equation 5 to calculate or otherwise identify a TBS based on a summation of the respective parameters $Q_{m,c}v_cN_{RE,c}$ for each of the CC 205-a, the CC 205-b, and the CC 205-c. The device may rate match the encoded bits corresponding to the TB to the set of CCs 205 based on the TBS. Additionally, the device may calculate a quantity of available channel bits $b_c$ for each of the CCs 205 based on the scheduling information associated with the TB and using Equation 4.

Based on the calculated TBS, the device may segment the TB into a set of CBs 210, and may perform encoding and rate matching for each CB 210 (e.g., for the respective encoded bits corresponding to each CB 210). The device may place the coded bits for each CB 210 in a corresponding circular buffer. Additionally, based on the TBS, the quantity of CCs 205 in the set of CCs 205, and the quantity of available channel bits be for each of the CCs 205, the device may calculate a quantity of bits 225 (e.g., a quantity of rate matched, coded bits) allocated to each CB 210 per CC 205. For example, for the CC 205-a, the device may allocate a quantity of bits 225 to respective portions of each CB 210 such that the total quantity of bits is equal to the quantity of available channel bits $b_c$ for the CC 205-a. The quantity of bits 225 available for a CB 210 in a CC 205 (e.g., $E_{r,c,cb}$) may be additionally be based on $Q_{m,c}$ for the CC 205 and the quantity of CBs 210 (e.g., C), as illustrated by Equation 6.

$$E_{r,c,cb} = N_{L,c}Q_{m,c}\left[\left[\frac{b_c}{N_{L,c}Q_{m,c}C}\right]\right] \quad (6)$$

In Equation 6, the operator ⌊ 540 ⌉ indicates a floor operation or a ceiling operation, for example, based on an index of the associated CB 210. In the example of FIG. 2, the device may calculate a value of $E_{r,c,cb}$ for each CB 210 in each CC 205.

To map the CBs 210 to the CCs 205, the device may identify a respective set of redundancy portions (i.e., portions of the circular buffer corresponding to redundancy versions) for each CB 210. For example, the device may identify a first set of redundancy portions for the CB 210-a, a second set of redundancy portions for the CB 210-b, a third set of redundancy portions for the CB 210-c, and so forth. The device may allocate, for each CB 210, a respective redundancy portion from the set of redundancy portions to each CC 205; each respective redundancy portion may include a respective quantity of bits 225 as determined by Equation 6 for the corresponding CC 205. For example, the device may allocate a first redundancy portion of the CB 210-a to the CC 205-a, where the first redundancy portion of the CB 210-a starts at a starting bit 215, includes a quantity of bits 225, and ends at an ending bit 220. The device may additionally allocate a first redundancy portion of the CB 210-b, a first redundancy portion of the CB 210-c, a first redundancy portion of the CB 210-d, and a first redundancy portion of the CB 210-e to the CC 205-a.

The device may allocate a second redundancy portion of the CB 210-a, a second redundancy portion of the CB 210-b, a second redundancy portion of the CB 210-c, a second redundancy portion of the CB 210-d, and a second redundancy portion of the CB 210-e to the CC 205-b. Each redundancy portion allocated to the CC 205-b may include a quantity of bits 225 calculated by Equation 6 for the CC 205-b (e.g., using the parameters corresponding to the CC 205-b). For the CC 205-c, the device may calculate a quantity of bits 225 available for each CB 210 based on the corresponding parameters, and may allocate a third redundancy portion of the CB 210-a, a third redundancy portion of the CB 210-b, a third redundancy portion of the CB 210-c, a third redundancy portion of the CB 210-d, and a third redundancy portion of the CB 210-e to the CC 205-c.

In some examples, allocation of redundancy portions of CBs 210 may be based on an ordering. For example, the device may allocate redundancy portions in order based on indexes of the CBs 210, where an initial redundancy portion allocated to a CC 205 corresponds to a CB 210 having a highest (e.g., or lowest) CB index, a subsequent redundancy portion allocated to the CC 205 corresponds to a CB 210 having the next highest (e.g., or lowest) CB index, and so on. Additionally, or alternatively, the device may order the CCs 205 based on a respective CC index, a respective modulation order, or both, and may allocate respective redundancy portions of each CB 210 to the CCs 205 based on the ordering. As an illustrative example, the device may order the CCs 205 from lowest CC index to highest CC index. The device may allocate redundancy portions of the CBs 210 to the CC 205 having the lowest CC index first, before allocating redundancy portions of the CBs 210 to the CC 205 having the next lowest CC index. In some examples, the device may be configured with or may receive an indication of an ordering of the CCs 205, for instance, via control signaling (e.g., RRC signaling, DCI).

Additionally, allocation of respective redundancy portions of each CB 210 to each CC 205 may be based on a respective starting bit 215, and, in some cases, a respective ending bit 220, of each redundancy portion. For example, as described in more detail with reference to FIG. 3, the device may identify a starting bit 215 (e.g., a starting bit position $k_{0,cc,cb}$) for each redundancy portion, where the starting bit 215 has an index value corresponding to a position of the starting bit 215 in a circular buffer. In some examples, a starting bit 215 for a redundancy portion may be identified based on a quantity of bits 225 and a starting bit 215 of a previous redundancy portion. For example, in the CC 205-a, a starting bit 215 for the redundancy portion of the CB 210-b may be based on a starting bit 215 and quantity of bits of the redundancy portion of the CB 210-a. Put another way, the starting bit for the redundancy portion of the CB 210-b may occur at the next bit after the ending bit 220 of the previously allocated redundancy portion in the CC 205-a, e.g., the redundancy portion of the CB 210-a.

In some examples, the quantity of bits 225 may be different for each redundancy portion, each CB 210, or a combination thereof. For instance, the device may use Equation 6 to determine a quantity of bits 225 available for a CB 210 in a CC 205 (e.g., $E_{r,c,cb}$), where Equation 6 utilizes a floor operation or a ceiling operation based on a CB index j of the CB 210. As an example, for a CB 210, if j is less than a configured value, $E_{r,c,cb}$ may be calculated using a floor operation, and if j is greater than a configured value, $E_{r,c,cb}$ may be calculated using a ceiling operation. As such, different CBs 210 may have different quantities of bits 225 available in a CC 205. More specifically, redundancy portions of CBs 210 that are initially allocated to a CC 205 may have smaller quantities of bits 225 available than redundancy portions of CBs 210 that are later allocated to the CC 205. In the example of FIG. 2, for instance, a quantity of bits 225 available for the CBs 210-a and 210-b may be less than a quantity of bits available for the CBs 210-c, 210-d, and 210-e.

To enable an even distribution of available bits across CBs 210, the device may identify an adjustment factor for each CC 205, and may determine a quantity of bits 225 allocated to a CB 210 for a CC 205 (e.g., $E_{r,c,cb}$) based on the corresponding adjustment factor. Put another way, the device may adjust a quantity of bits 225 allocated to a CB 210 based on the CC 205 to which the CB 210 (i.e., encoded bits corresponding to the CB 210) is being mapped. For example, the device may determine whether to use a floor operation or a ceiling operation in Equation 6 based on an adjustment factor α, the CB index j, the CC index cc, and the quantity of CBs 210, as given by Equation 7.

$$(j+\alpha(cc)) \bmod(C) \qquad (7)$$

If Equation 7 for a CB 210 in a CC 205 is less than a configured value, $E_{r,c,cb}$ may be calculated using a floor operation, and if Equation 7 is greater than a configured value, $E_{r,c,cb}$ may be calculated using a ceiling operation.

As an illustrative example, the device may identify a first adjustment factor for the CC 205-a and a second adjustment factor for the CC 205-b. The device may calculate, or otherwise identify, for the CC 205-a, a quantity of bits 225 allocated to the CB 210-a and a quantity of bits 225 allocated to the CB 210-b based on the first adjustment factor. For the CC 205-b, the device may calculate or otherwise identify a quantity of bits 225 allocated to the CB 210-a and a quantity of bits 225 allocated to the CB 210-b based on the second adjustment factor.

Additionally, or alternatively, an initial CB 210 mapped to a CC 205 may be different for each CC 205. The device may map CBs 210 to a CC 205, such as the CC 205-a, starting with an initial CB 210 that is identified based on an ordering of the CB 210 indexes. As illustrated in FIG. 2, the initial redundancy portion allocated to the CC 205-a may correspond to a starting CB 210-a based on the index of the CB 210-a. The device may adjust the starting CB 210 mapped to the CC 205-b, such that the initial redundancy portion allocated to the CC 205-b corresponds to a CB 210 that is different than the CB 210-a. For example, the device may perform a circular shift of the ordering of the CB 210 indexes for a subsequent CC 205. In some cases, the circular shift may be performed based on Equation 7. Here, the device may adjust the starting CB 210 to be a CB 210 that was allocated a smaller quantity of bits 225 in the previous CC 205.

In some examples, the device may determine to encode the TB using limited buffer rate matching (LBRM). For example, the device may only be able to store a limited quantity of bits in a buffer, and as such, may be associated with a maximum supported TBS (e.g., a maximum quantity of coded bits corresponding to the TB). Using Equation 8, the device may identify the maximum supported TBS based on the set of configured CCs, which may include, but is not limited to, the set of CCs 205 over which the TB is scheduled.

$$N_{info} = R \Sigma_{c=1}^{T} Q_{m,c} v_c N_{RE,c} \qquad (8)$$

In Equation 8, for each configured CC in the set of configured CCs T, the device may identify a maximum modulation order $Q_{m,c}$, a maximum rank $v_c$, and a maximum quantity of available resource elements $N_{RE,c}$, where $N_{RE,c}$ is based on a quantity of allocated resource blocks $n_{PRB,LBRM}$ (e.g., $N_{RE,c} = 156 n_{PRB,LBRM}$). The coding rate R may be equal to 948/1024. $N_{info}$ may represent a threshold quantity of information bits of a TB that corresponds to the maximum supported TBS. If the TB scheduled over the set of CCs 205 is associated with a TBS that is greater than the maximum supported TBS (e.g., calculated based on Equation 8), the device may determine to encode the TB using LBRM. For example, the device may truncate coded bits of the TB such that the TBS does not exceed the maximum supported quantity of coded bits.

Figure 3A:
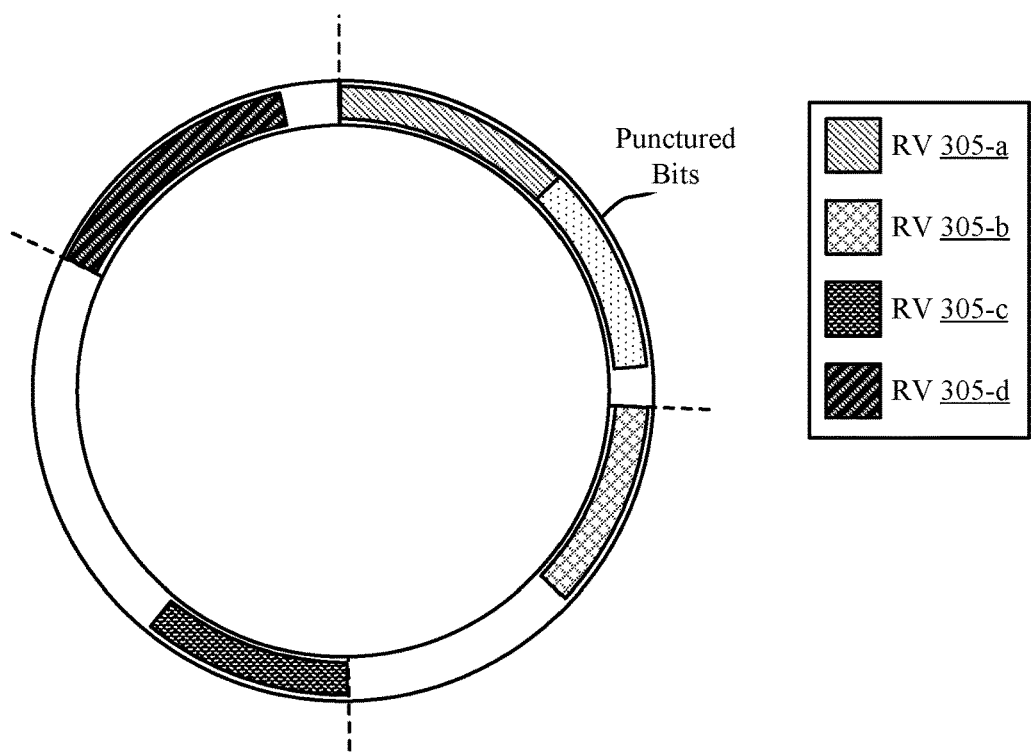
FIGS. 3A and 3B illustrate examples of circular buffers that support redundancy version cross carrier interleaving in accordance with aspects of the present disclosure.
Figure 3B:
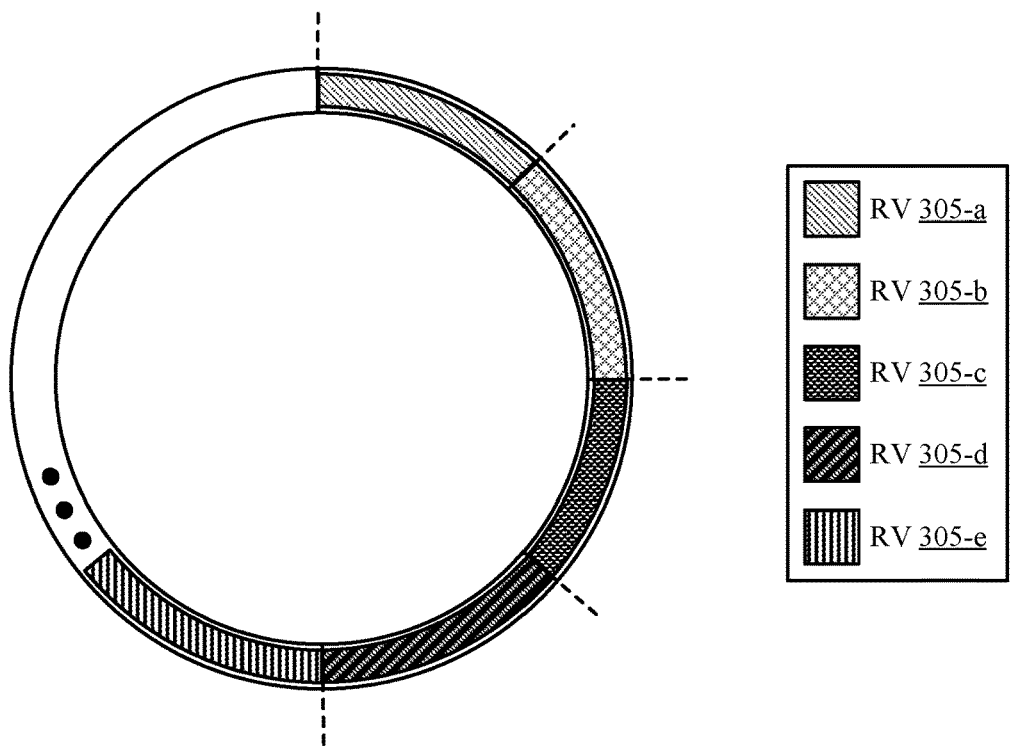

FIGS. 3A and 3B illustrate examples of circular buffers 301 and 302, respectively, that support redundancy version cross carrier interleaving in accordance with aspects of the present disclosure. Circular buffers 301 and 302 may implement aspects of wireless communications system 100 or may be implemented by aspects of wireless communications system 100 as described herein with reference to FIG. 1. For example, circular buffers 301 and 302 may be implemented by a base station 105 or a UE 115, which may be examples of a base station 105 and a UE 115 as described with reference to FIG. 1. Circular buffers 301 and 302 may include multiple RVs 305, which may be configured to support a transmission as described with reference to FIG. 2.

In some wireless communications systems, a device (e.g., a UE, a base station, etc.) may store information (e.g., log-likelihood ratios (LLRs)) for a transmission in an incremental redundancy buffer. For example, the device may use a circular buffer to map coded bits (e.g., low-density parity-check (LDPC) coded bits) of a data transmission (e.g., a TB). The coded bits of the data transmission may include both systematic bits (e.g., information bits) and parity bits. Systematic bits may correspond to data (e.g., information) from the data transmission, whereas parity bits may be used for performing forward error correction (FEC) techniques on the data transmission (e.g., once the data transmission has been received). The circular buffer may include different sections of coded bits, where each section represents the same set of information bits but may include different parity bits. These different sections may be referred to as RVs. Each RV in the circular buffer may be associated with a different combination of systematic bits and parity bits.

As described with reference to FIG. 2, to transmit a TB over a set of CCs, a device may map portions of CBs (e.g., portions of encoded bits corresponding to CBs) of the TB to each CC, where each portion of a CB corresponds to a redundancy version (RV) of a circular buffer of the CB. In FIGS. 3A and 3B, for example, the circular buffer 301 or the circular buffer 302 may correspond to a CB. That is, the device may map encoded and rate-matched bits of a CB to a circular buffer that includes RVs 305. Each RV 305 may include a quantity of bits based on a quantity of CCs in the set of CCs and a quantity of CBs in the TB. Based on a quantity of bits of a CC that are allocated to the CB (e.g., $E_{r,c,cb}$), the device may map a respective portion of an RV 305 (e.g., a redundancy portion) from the circular buffer to a CC. For example, the device may map a first quantity of bits from the circular buffer to a first CC, where the first quantity of bits corresponds to a first RV 305-a. The device may map a second quantity of bits from the circular buffer corresponding to a second RV 305-b to a second CC, and so on, until each CC includes a portion of the CB.

In some cases, however, a configuration of the circular buffer may result in punctured systematic bits. For example, in FIG. 3A, the circular buffer 301 may be configured such that some systematic bits mapped to the circular buffer 301 are not transmitted in any of the RVs 305. Additionally, each RV 305 in the circular buffer 301 may have a fixed starting bit position $k_0$ that is determined based on an RV identifier (RVID), a quantity of bits in the CB, and a lifting factor $Z_c$ associated with the TB. The device may map a portion of an RV 305, such as an RV 305-*a*, to a first CC starting at $k_0$. However, if the quantity of bits $E_{r,c,cb}$ allocated to the first CC is less than the total quantity of bits in the RV 305-*a*, the device may puncture (i.e., drop) bits of the RV 305-*a*. Additionally, because each subsequent RV 305 has a fixed starting bit position $k_0$, the device may be unable to include the punctured bits in any other RVs 305. Punctured systematic bits may result in unreliable and inefficient data transmissions. For example, if the device transmits a data transmission to a receiving device and some systematic bits from the data transmission are punctured during the transmission process, the receiving device may not receive the punctured systematic bits and thus may not receive the information carried by the punctured systematic bits.

In accordance with aspects of the present disclosure, the device may increase reliability and efficiency for the TB using RV configurations defined by the circular buffer 302 illustrated in FIG. 3B. For example, the circular buffer 302 may correspond to coded bits corresponding to a first CB of a TB that is scheduled to be transmitted over a set of CCs. Each CB of the TB may be mapped to a corresponding circular buffer 302. The circular buffer 302 may include at least RV 305-*a*, RV 305-*b*, RV 305-*c*, RV 305-*d*, and RV 305-*e*, but it is to be understood that circular buffer 301 may include any number of RVs 305. The circular buffer 302 may be configured such that a starting pointer (e.g., an index value of a starting bit position) of each RV 305 is based on a previous adjacent RV 305 ending, such that a subsequent RV 305 may directly follow the end of a previous RV 305. For example, the start of the RV 305-*b* may directly follow the end of the RV 305-*a*. Likewise, the start of the RV 305-*c* may directly follow the end of the RV 305-*b*, the start of the RV 305-*d* may directly follow the end of the RV 305-*c*, and the start of the RV 305-*e* may directly follow the end of the RV 305-*d*. As a result, when the device allocates respective portions of RVs 305 to each CC, the bits that are mapped to the circular buffer 302 may not be punctured during the transmission process.

In some examples, the device may identify starting points (i.e., starting bit positions) for each RV 305 included in the circular buffer 302. When a quantity of bits $E_{r,c,cb}$ of the CB is mapped to a CC, the device may read the bits from the circular buffer 302 beginning at the identified starting point of the corresponding RV 305. To map to an initial CC, the device may identify a starting bit position $k_{0,0,cb}$ (e.g., based on the associated RVID) and a quantity of bits $E_{r,0,cb}$ (e.g., using Equation 6 described with reference to FIG. 2) of the initial RV 305 (e.g., RV 305-*a*) in the circular buffer 302. For subsequent CCs, the device may identify a starting bit position $k_{0,cc,cb}$ and corresponding quantity of bits $E_{r,c,cb}$ of the associated RV 305, where the starting bit position $k_{0,cc,cb}$ depends on the starting point of the previous RV 305 (e.g., $k_{0,cc-1,cb}$) and a quantity of bits of the previous RV 305 (e.g., $E_{r,cc-1,cb}$). Generally, a starting bit position $k_{0,cc,cb}$ for an RV 305 of a CB mapped to a CC may be given by Equation 9.

$$k_{0,cc,cb} = k_{0,cc-1,cb} + E_{r,cc-1,cb} \quad (9)$$

For example, to map a CB corresponding to the circular buffer 302 to the set of CCs, the device may identify a first starting bit position $k_{0,0,cb}$ and a first quantity of bits $E_{r,0,cb}$ for the first RV 305-*a*. The device may allocate, to a first CC, the first quantity of bits $E_{r,0,cb}$ by reading the $E_{r,0,cb}$ bits from the first RV 305-*a* beginning at $k_{0,0,cb}$. For a second CC, the device may identify a second quantity of bits $E_{r,1,cb}$, as well as a second starting bit position $k_{0,1,cb}$ using Equation 9, e.g., based on the first starting bit position $k_{0,0,cb}$ and the first quantity of bits $E_{r,0,cb}$. The device may allocate $E_{r,1,cb}$ bits from the second RV 305-*b* to the second CC beginning at the starting bit position $k_{0,1,cb}$. For a third CC, the device may identify a third quantity of bits $E_{r,2,cb}$ and a second starting bit position $k_{0,2,cb}$, where $k_{0,2,cb}$ is based on the second starting bit position $k_{0,1,cb}$ and the second quantity of bits $E_{r,1,cb}$. The device may allocate $E_{r,2,cb}$ bits from the third RV 305-*c* to the third CC beginning at the starting bit position $k_{0,2,cb}$. In this manner, the device may identify starting bit positions $k_{0,cc,cb}$ and bit quantities $E_{r,cc,cb}$ for corresponding RVs 305 for each CC in the set of CCs.

In some examples, the starting bit position $k_{0,cc,cb}$ of RVs 305 mapped to CCs other than the first CC may be common for the RVs 305 in the CC. That is, an index value of a starting bit position for an RV 305 mapped to a second CC may be different than an index value of a starting bit position for an RV 305 mapped to a first CC. For example, rather than calculating $k_{0,cc,cb}$ using Equation 9, the device may use Equation 10.

$$k_{0,cc,cb} = k_{0,cc-1,cb} + \min_{cb} E_{r,cc-1,cb} \quad (10)$$

Here, the device may calculate a minimum quantity of bits $E_{r,cc-1,cb}$ allocated to a CB in the previous CC. For example, in the first CC, the device may allocate 300 bits of a first RV 305-*a* for a first CB, 200 bits of a first RV 305-*a* for a second CB, and 100 bits of a first RV 305-*a* for a third CB. For the second CC, $$\min_{cb} E_{r,cc-1,cb}$$

may be equal to 100 bits. Accordingly, each RV 305-*b* allocated to the second CC may have a starting bit position that is 100 bits after the starting bit position of the corresponding RV 305-*a* in the first CC. Equation 10 may alternatively be calculated based on a maximum quantity of bits $E_{r,cc-1,cb}$, an average quantity of bits $E_{r,cc-1,cb}$, or the like, among other examples. Configuring a common $k_{0,cc,cb}$ may reducing processing and computational complexity, as the device may not carry over the quantity of bits $E_{r,cc,cb}$ for every calculation of $k_{0,cc,cb}$.

In some cases, the device may identify a lifting factor $Z_c$ associated with the transport block, and may modify starting or ending bit positions of RVs 305 based on the lifting factor. For example, if a starting bit position of the circular buffer 302 is not a multiple of $Z_c$, the device may apply a rounding function, such as a floor operation, associated with $Z_c$ to an ending bit position of the first RV 305-*a* allocated to the first CC. The device may identify a starting bit position $k_{0,1,cb}$ for the second RV 305-*b* allocated to the second CC based on applying the rounding function. Additionally, for a second CB associated with a circular buffer 302, the device may apply the rounding function to a second ending bit position for a first RV 305-*a* of the second CB allocated to the first CC, and may identify a starting bit position $k_{0,1,cb}$ for a second RV 305-*b* of the second CB allocated to the second CC. In some examples, the device may calculate a starting bit position based on a rounding function as illustrated by Equation 11.

$$k_{0,cc,cb} = k_{0,cc-1,cb} + Z_c \left\lfloor Z_c^{-1} \min_{cb} E_{r,cc-1,cb} \right\rfloor \quad (11)$$

In some examples, the device may identify starting bit positions $k_{0,cc,cb}$ for RVs 305 allocated to each CC based on an estimated quantity of resource elements included in a previous CC. For example, rather than calculating $k_{0,cc,cb}$ based on an exact quantity of bits $E_{r,cc-1,cb}$ of each RV 305 in each CC, the device may calculate $k_{0,cc,cb}$ estimating a quantity of bits based on a nominal quantity of resource elements available in the previous CC (e.g., $N_{RE,cc-1}$), the modulation order and rank of the previous CC, and the total quantity of CBs C, as in Equation 12.

$$k_{0,cc,cb} = k_{0,cc-1,cb} + \left\lfloor \frac{Q_{m,cc-1} v_{cc-1} N_{RE,cc-1}}{C} \right\rfloor \quad (12)$$

For example, the device may estimate $N_{RE,0}$ for the first CC, e.g., based on the TBS. Using Equation 12, the device may identify a starting bit position $k_{0,1,cb}$ for an RV 305 (e.g., an RV 305-b) of the first CB allocated to the second CC and a starting bit position $k_{0,1,cb}$ for an RV 305 (e.g., an RV 305-b) of the second CB allocated to the second CC. In some examples, $N_{RE,cc-1}$ may be a configured value and may be the same for the CCs used to transmit the TB. In other examples, $N_{RE,cc-1}$ may be defined (i.e., configured) per CC, and may be based on a quantity of bits per CB of the TB.

Defining starting bit positions for RVs 305 in a circular buffer 302, as described herein, may allow the device to map CBs to CCs with greater reliability and improved efficiency. That is, employing modified RV definitions may enable the device to reduce a number of punctured systematic bits in the circular buffer 302.

Figure 4:
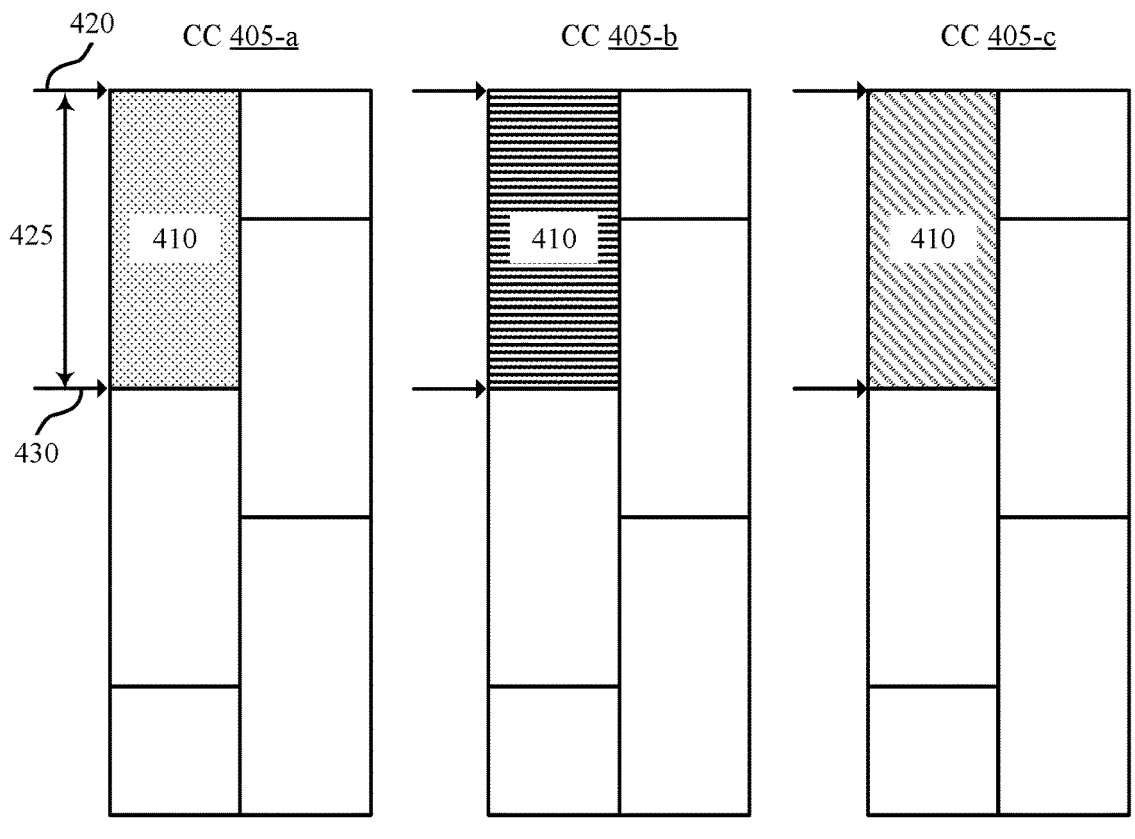
FIG. 4 illustrates an example of an allocation scheme that supports redundancy version cross carrier interleaving in accordance with aspects of the present disclosure.
Figure 4:
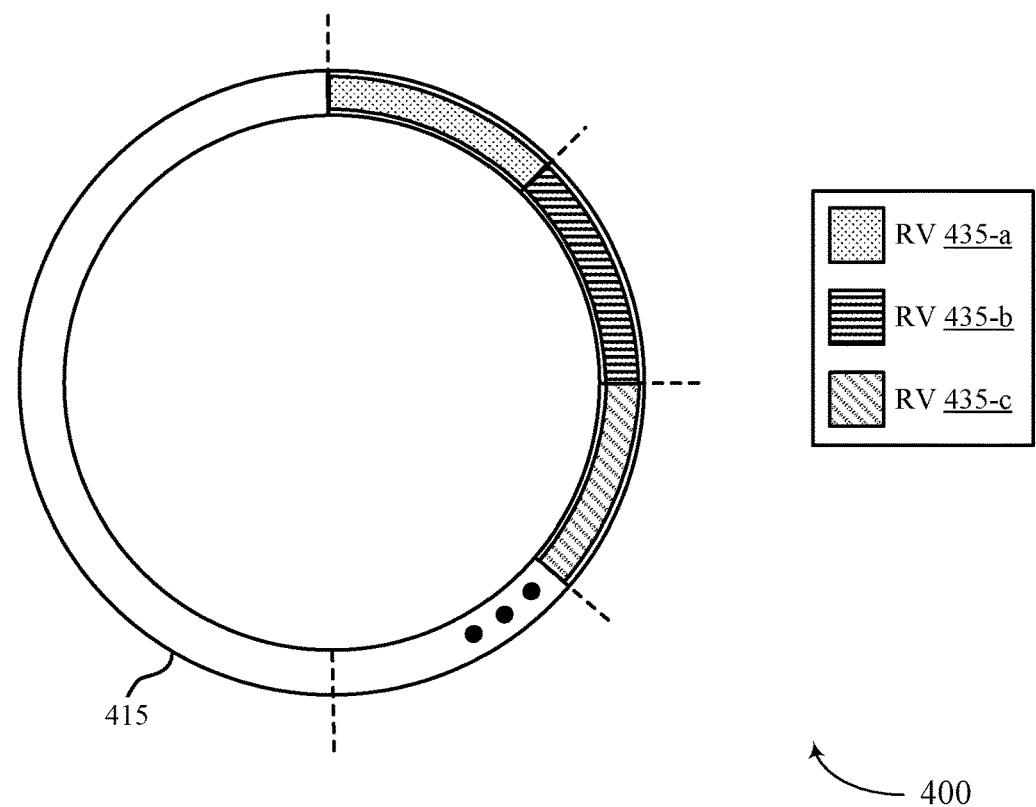

FIG. 4 illustrates an example of an allocation scheme 400 that supports redundancy version cross carrier interleaving in accordance with aspects of the present disclosure. The allocation scheme 400 may implement aspects of the wireless communications system 100 or may be implemented by aspects of the wireless communications system 100 as described herein with reference to FIG. 1. For example, a device, such as a base station 105, a UE 115, or the like, may implement the allocation scheme 400 to transmit a TB across a set of CCs 405 in accordance with the techniques described herein. The allocation scheme 400 may support transmission of a TB with higher frequency diversity and enhanced reliability, among other benefits.

As described with reference to FIGS. 2, 3A, and 3B, a device may identify a TBS for a TB that is scheduled across a set of CCs 405 including at least a CC 405-a, a CC 405-b, and a CC 405-d. The TB may include at least a first CB and a second CB, and the device may rate match coded bits corresponding to the TB with the set of CCs 405. FIG. 4 illustrates a circular buffer 415 corresponding to a first CB 410. The device may map coded bits of the CB 410 to the circular buffer, which may include a set of RVs 435. The device may allocate a quantity of bits 425 (e.g., rate-matched, encoded bits) for the first CB 410 to each CC 405. Each quantity of bits 425 may correspond to an RV 435, and the allocation to a respective CC 405 may be based on a starting bit position 420 and an ending bit position 430 of the respective quantity of bits 425.

For example, the device may identify, for a first CC 405 (e.g., the CC 405-a), a first starting bit position 420 and a first quantity of bits 425 allocated to the first CB 410 and corresponding to a first RV 435-a (e.g., a first redundancy portion) of the circular buffer 415. The first quantity of bits 425 may be based on a quantity of CBs of the TB and a quantity of available bits of the first CC 405-a. The device may identify, for a second CC (e.g., the CC 405-b), a second quantity of bits 425 allocated to the first CB 410 based on the quantity of CBs of the TB, the quantity of available bits of the first CC 405-a, and a quantity of available bits of the second CC 405-b. The second quantity of bits 425 may correspond to a second RV 435-b. The device may identify a second starting bit position 420 for the second RV 435-b based on the first starting bit position 420 and the first quantity of bits 425 of the first RV 435-a.

Additionally, the device may identify, for a third CC (e.g., the CC 405-c), a third quantity of bits 425 allocated to the first CB 410 and corresponding to a third RV 435-c. The third quantity of bits 425 may be based on the quantity of CBs of the TB, the quantity of available bits of the second CC 405-a, and a quantity of available bits of the third CC 405-b. The device may identify a third starting bit position 420 for the third RV 435-c based on the second starting bit position 420 and the second quantity of bits 425 of the second RV 435-b.

The device may map (i.e., allocate) each RV 435 to the respective CC 405 based on the corresponding starting bit position 420 and quantity of bits 425. For example, for the CC 405-a, the device may read bits of the RV 435-a from the circular buffer 415, beginning at the corresponding starting bit position 420, for a length of bits equal to the corresponding quantity of bits 425. For the CC 405-b, the device may map the RV 435-b beginning at the corresponding starting bit position 420 and based on the starting bit position 420 and quantity of bits 425 of the previous RV 435-a. Put another way, the first starting bit position 420 for the second RV 435-b may directly follow the ending bit position 430 of the first RV 435-a in the circular buffer 415. Accordingly, when the device maps the first RV 435-a to the first CC 405-a and the second RV 435-b to the second CC 405-b, the device may avoid puncturing bits of the circular buffer 415.

Reducing or otherwise avoiding punctured bits in a transmission may improve the likelihood that a receiving device is able to successfully decode the TB. Additionally, by mapping RVs 435 of the first CB 410 to each CC 405, the device may transmit the TB with increased frequency diversity. Accordingly, even if a CC 405 is lost or attenuated, the receiving device may recover the TB using RVs 435 carried by the remaining CCs 405.

Figure 5:
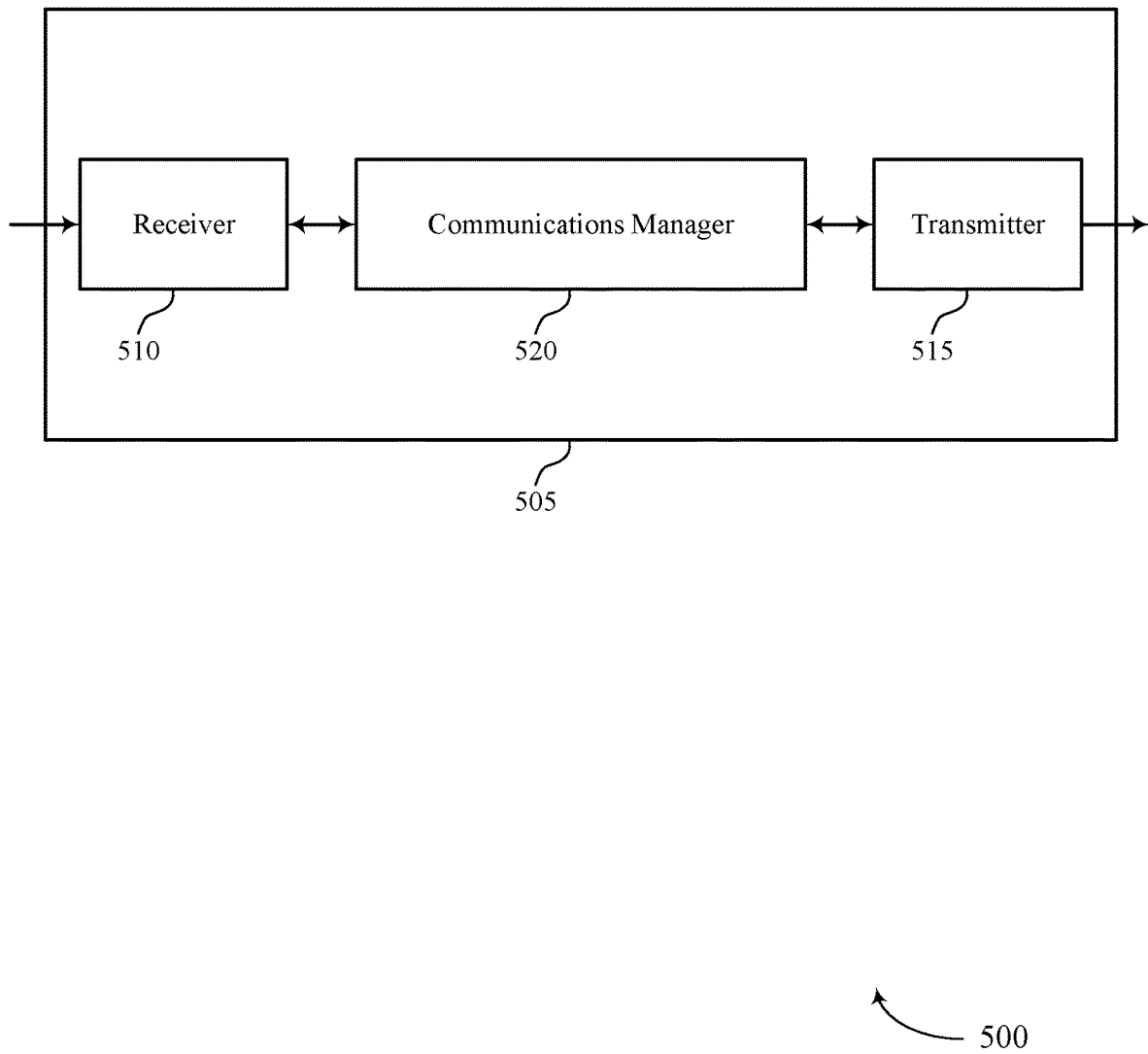
FIGS. 5 and 6 show block diagrams of devices that support redundancy version cross carrier interleaving in accordance with aspects of the present disclosure.

FIG. 5 shows a block diagram 500 of a device 505 that supports redundancy version cross carrier interleaving in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to redundancy version cross carrier interleaving). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to redundancy version cross carrier interleaving). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of redundancy version cross carrier interleaving as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless device in accordance with examples as disclosed herein. For example, the communications manager 520 may be configured as or otherwise support a means for identifying a TBS for a TB that is scheduled across a set of CCs including a first CC and a second CC, the TB including a first CB and a second CB. The communications manager 520 may be configured as or otherwise support a means for rate-matching the TB with the set of CCs. The communications manager 520 may be configured as or otherwise support a means for identifying a first set of redundancy portions of the first CB and a second set of redundancy portions of the second CB based on rate-matching the TB. The communications manager 520 may be configured as or otherwise support a means for allocating a first redundancy portion of the first CB to the first CC and a second redundancy portion of the first CB to the second CC. The communications manager 520 may be configured as or otherwise support a means for allocating a first redundancy portion of the second CB to the first CC and a second redundancy portion of the second CB to the second CC. The communications manager 520 may be configured as or otherwise support a means for transmitting the TB over the set of CCs based on allocating various redundancy portions of the first CB and the second CB to various CCs.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving communication reliability. For example, by interleaving redundancy versions of CBs across CCs, the communications manager 520 may support increased frequency diversity, providing improved reliability for transmissions of a TB. Improved communication reliability may reduce a number of retransmissions requested by a wireless device, as transmissions may be less likely to fail. Reducing the number of retransmissions may reduce a number of times the processor ramps up processing power and turns on processing units to handle message retransmissions.

Figure 6:
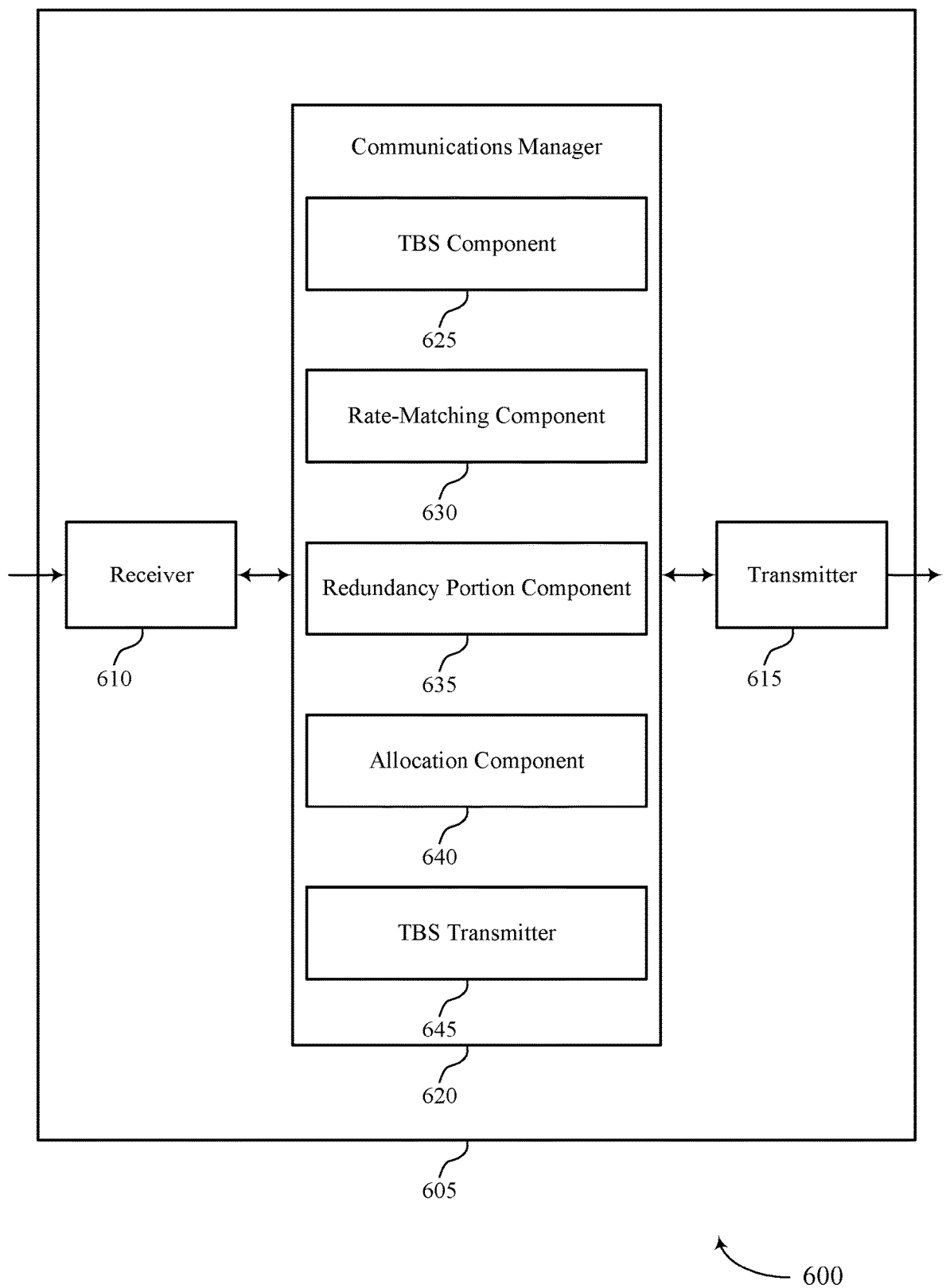

FIG. 6 shows a block diagram 600 of a device 605 that supports redundancy version cross carrier interleaving in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to redundancy version cross carrier interleaving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to redundancy version cross carrier interleaving). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of redundancy version cross carrier interleaving as described herein. For example, the communications manager 620 may include a TBS component 625, a rate-matching component 630, a redundancy portion component 635, an allocation component 640, a TBS transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a wireless device in accordance with examples as disclosed herein. The TBS component 625 may be configured as or otherwise support a means for identifying a TBS for a TB that is scheduled across a set of CCs including a first CC and a second CC, the TB including a first CB and a second CB. The rate-matching component 630 may be configured as or otherwise support a means for rate-matching the TB with the set of CCs. The redundancy portion component 635 may be configured as or otherwise support a means for identifying a first set of redundancy portions of the first CB and a second set of redundancy portions of the second CB based on rate-matching the TB. The allocation component 640 may be configured as or otherwise support a means for allocating a first redundancy portion of the first CB to the first CC and a second redundancy portion of the first CB to the second CC. The allocation component 640 may be configured as or otherwise support a means for allocating a first redundancy portion of the second CB to the first CC and a second redundancy portion of the second CB to the second CC. The TBS transmitter 645 may be configured as or otherwise support a means for transmitting the TB over the set of CCs based on allocating various redundancy portions of the first CB and the second CB to various CCs.

Figure 7:
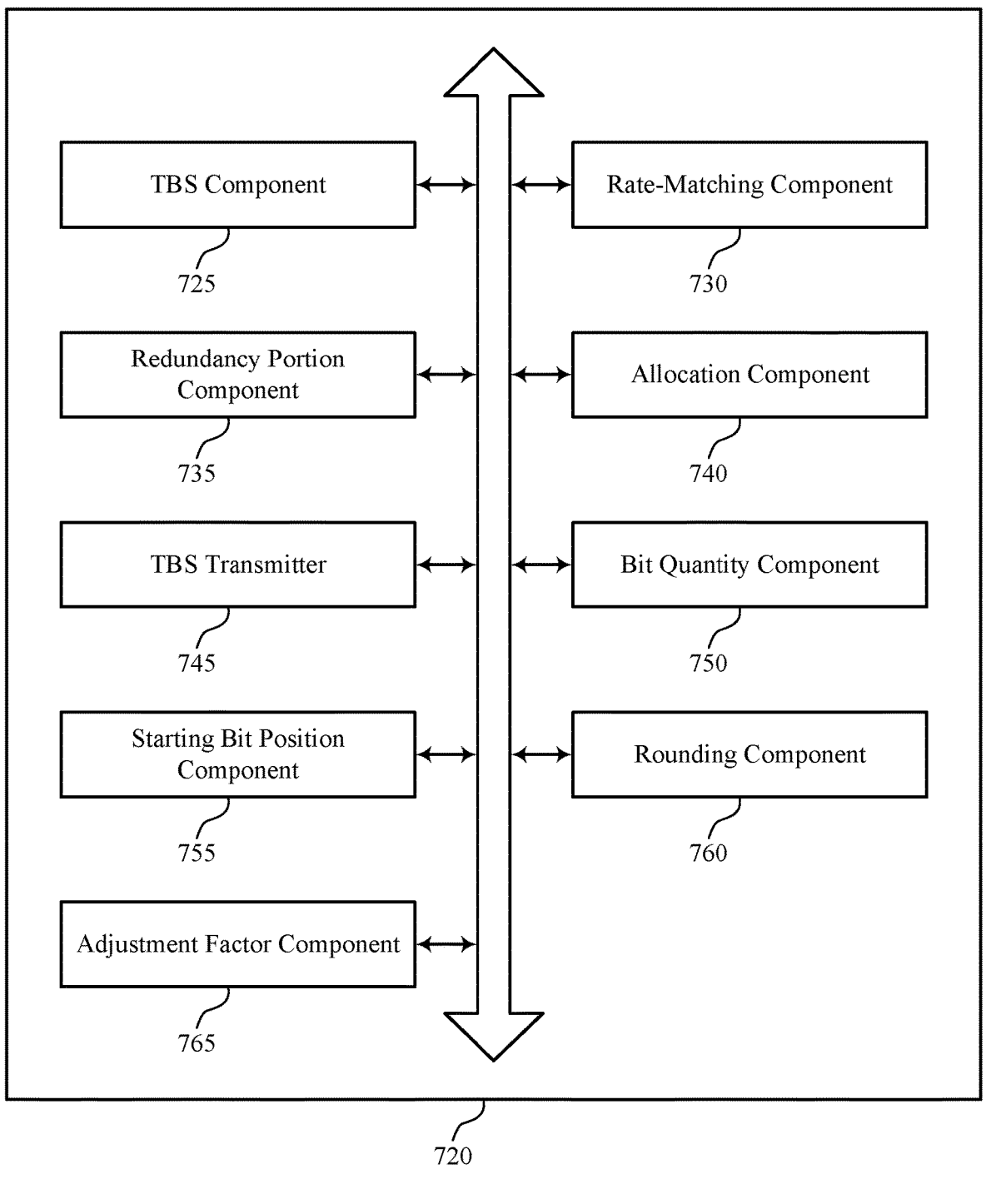
FIG. 7 shows a block diagram of a communications manager that supports redundancy version cross carrier interleaving in accordance with aspects of the present disclosure.

FIG. 7 shows a block diagram 700 of a communications manager 720 that supports redundancy version cross carrier interleaving in accordance with aspects of the present disclosure. The communications manager 720 may be an example of aspects of a communications manager 520, a communications manager 620, or both, as described herein. The communications manager 720, or various components thereof, may be an example of means for performing various aspects of redundancy version cross carrier interleaving as described herein. For example, the communications manager 720 may include a TBS component 725, a rate-matching component 730, a redundancy portion component 735, an allocation component 740, a TBS transmitter 745, a bit quantity component 750, a starting bit position component 755, a rounding component 760, an adjustment factor component 765, or any combination thereof. Each of these components may communicate, directly or indirectly, with one another (e.g., via one or more buses).

The communications manager 720 may support wireless communications at a wireless device in accordance with examples as disclosed herein. The TBS component 725 may be configured as or otherwise support a means for identifying a TBS for a TB that is scheduled across a set of CCs including a first CC and a second CC, the TB including a first CB and a second CB. The rate-matching component 730 may be configured as or otherwise support a means for rate-matching the TB with the set of CCs. The redundancy portion component 735 may be configured as or otherwise support a means for identifying a first set of redundancy portions of the first CB and a second set of redundancy portions of the second CB based on rate-matching the TB. The allocation component 740 may be configured as or otherwise support a means for allocating a first redundancy portion of the first CB to the first CC and a second redundancy portion of the first CB to the second CC. In some examples, the allocation component 740 may be configured as or otherwise support a means for allocating a first redundancy portion of the second CB to the first CC and a second redundancy portion of the second CB to the second CC. The TBS transmitter 745 may be configured as or otherwise support a means for transmitting the TB over the set of CCs based on allocating various redundancy portions of the first CB and the second CB to various CCs.

In some examples, the bit quantity component 750 may be configured as or otherwise support a means for identifying, for the first CC, a first quantity of bits allocated to the first CB and a second quantity of bits allocated to the second CB based on a quantity of CBs of the TB and a quantity of available bits of the first CC. In some examples, the bit quantity component 750 may be configured as or otherwise support a means for identifying, for the second CC, a third quantity of bits allocated to the first CB and a fourth quantity of bits allocated to the second CB based on the quantity of CBs of the TB, the quantity of available bits of the first CC, and the quantity of available bits of the second CC, where identifying the first set of redundancy portions of the first CB and the second set of redundancy portions of the second CB is based on identifying the first quantity of bits, the second quantity of bits, the third quantity of bits, and the fourth quantity of bits.

In some examples, the first redundancy portion of the first CB is based on the first quantity of bits of the first CC allocated to the first CB. In some examples, the first redundancy portion of the second CB is based on the second quantity of bits of the first CC allocated to the second CB. In some examples, the second redundancy portion of the first CB is based on the third quantity of bits of the second CC allocated to the first CB. In some examples, the second redundancy portion of the second CB is based on the fourth quantity of bits of the second CC allocated to the second CB.

In some examples, the starting bit position component 755 may be configured as or otherwise support a means for identifying a first starting bit position for the first redundancy portion of the first CB, where allocating the first redundancy portion of the first CB to the first CC is based on the first starting bit position and the first quantity of bits of the first CC allocated to the first CB. In some examples, the starting bit position component 755 may be configured as or otherwise support a means for identifying a second starting bit position for the second redundancy portion of the first CB based on the first starting bit position of the first redundancy portion of the first CB and the first quantity of bits of the first CC allocated to the first CB, where allocating the second redundancy portion of the first CB to the second CC is based on the second starting bit position and the third quantity of bits of the second CC allocated to the first CB.

In some examples, the starting bit position component 755 may be configured as or otherwise support a means for identifying a third starting bit position for the first redundancy portion of the second CB, where allocating the first redundancy portion of the second CB to the first CC is based on the third starting bit position and the second quantity of bits of the first CC allocated to the second CB. In some examples, the starting bit position component 755 may be configured as or otherwise support a means for identifying a fourth starting bit position for the second redundancy portion of the second CB based on the third starting bit position of the first redundancy portion of the second CB and the second quantity of bits of the first CC allocated to the second CB, where allocating the second redundancy portion of the second CB to the second CC is based on the fourth starting bit position and the fourth quantity of bits of the second CC allocated to the second CB.

In some examples, the starting bit position component 755 may be configured as or otherwise support a means for identifying a first starting bit position for the second redundancy portion of the first CB allocated to the second CC. In some examples, the starting bit position component 755 may be configured as or otherwise support a means for identifying a second starting bit position for the second redundancy portion of the second CB allocated to the second CC, where an index value of the first starting bit position is different than an index value of the second starting bit position, where allocating the second redundancy portion of the first CB and the second redundancy portion of the second CB to the second CC is based on the first starting bit position and the second starting bit position.

In some examples, the rounding component 760 may be configured as or otherwise support a means for applying a rounding function to a first ending bit position for the first redundancy portion of the first CB allocated to the first CC, the rounding function associated with a lifting factor associated with the TB. In some examples, the starting bit position component 755 may be configured as or otherwise support a means for identifying a first starting bit position for the second redundancy portion of the first CB allocated to the second CC based on applying the rounding function to the first ending bit position for the first redundancy portion of the first CB allocated to the first CC. In some examples, the rounding component 760 may be configured as or otherwise support a means for applying the rounding function to a second ending bit position for the first redundancy portion of the second CB allocated to the first CC, the rounding function associated with the lifting factor associated with the TB. In some examples, the starting bit position component 755 may be configured as or otherwise support a means for identifying a second starting bit position for the second redundancy portion of the second CB allocated to the second CC based on applying the rounding function to the second ending bit position for the first redundancy portion of the second CB allocated to the first CC, where allocating the second redundancy portion of the first CB and the second redundancy portion of the second CB to the second CC is based on the first starting bit position and the second starting bit position.

In some examples, the adjustment factor component 765 may be configured as or otherwise support a means for identifying a first adjustment factor for the first CC. In some examples, the bit quantity component 750 may be configured as or otherwise support a means for identifying, for the first CC, a first quantity of bits allocated to the first CB and a second quantity of bits allocated to the second CB based on the first adjustment factor. In some examples, the adjustment factor component 765 may be configured as or otherwise support a means for identifying a second adjustment factor for the second CC. In some examples, the bit quantity component 750 may be configured as or otherwise support a means for identifying, for the second CC, a third quantity of bits allocated to the first CB and a fourth quantity of bits allocated to the second CB based on the second adjustment factor, where allocating redundancy portions to the first CC and the second CC are based on the identifying the first quantity of bits, the second quantity of bits, the third quantity of bits, and the fourth quantity of bits.

In some examples, allocating redundancy portions to the first CC further comprises allocating a first quantity of bits of the first CC to the first redundancy portion of the first CB before allocating a second quantity of bits of the first CC to the first redundancy portion of the second CB, and the allocation component 740 may be configured as or otherwise support a means for adjusting a starting CB for the second CC based on allocating the first redundancy portion of the first CB before allocating the first redundancy portion of the second CB to the first CC, where allocating redundancy portions to the second CC further includes allocating a third quantity of bits of the second CC to the second redundancy portion of the second CB before allocating a fourth quantity of bits of the second CC the second redundancy portion of the first CB.

In some examples, the TBS component 725 may be configured as or otherwise support a means for estimating a quantity of resource elements associated with the first CC based on the TBS. In some examples, the starting bit position component 755 may be configured as or otherwise support a means for identifying a first starting bit position for the second redundancy portion of the first CB allocated to the second CC based on the quantity of resource elements. In some examples, the starting bit position component 755 may be configured as or otherwise support a means for identifying a second starting bit position for the second redundancy portion of the second CB allocated to the second CC based on the quantity of resource elements, where allocating the second redundancy portion of the first CB and the second redundancy portion of the second CB to the second CC is based on the first starting bit position and the second starting bit position.

In some examples, a quantity of resource elements associated with each CC of the set of CCs is equal.

In some examples, the first starting bit position and the second starting bit position are the same and are identified based on a quantity of bits per CB of the set of CBs.

In some examples, identifying the TBS is based on a respective modulation order, quantity of layers, quantity of resource elements, and coding rate for each CC of the set of CCs. In some examples, identifying the TBS is based on a respective maximum modulation order, maximum quantity of layers, quantity of resource elements, and coding rate for each CC of a set of multiple CCs including the set of CCs and a quantity of configured CCs.

In some examples, a quantity of bits in a redundancy portion is based on a quantity of CCs of the set of CCs and a quantity of CBs of the TB.

In some examples, the allocation component 740 may be configured as or otherwise support a means for ordering each CC of the set of CCs based on a respective CC index, a respective modulation order, or a combination thereof, where allocating redundancy portions to the set of CCs is based on the ordering.

Figure 8:
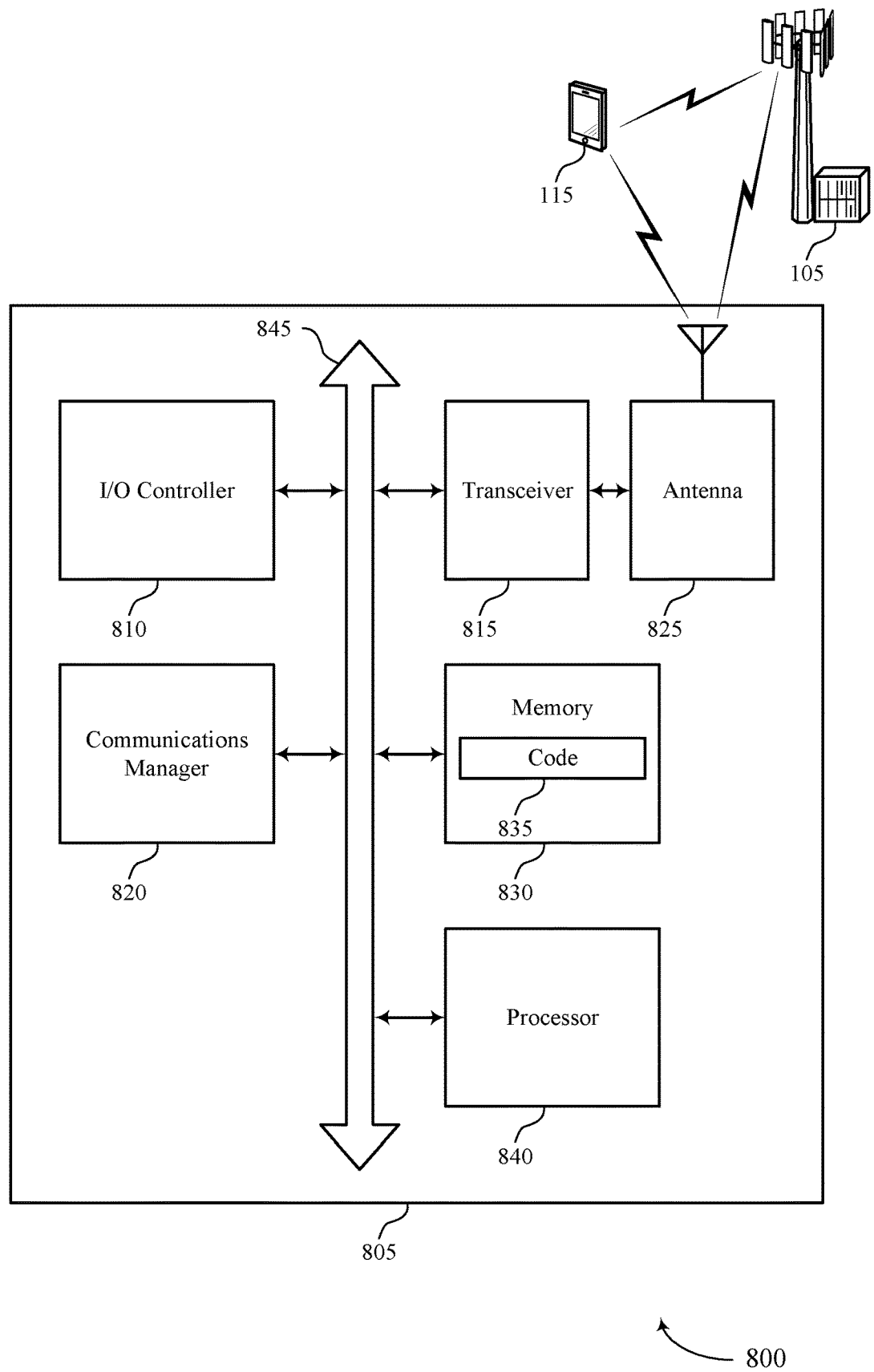
FIG. 8 shows a diagram of a system including a device that supports redundancy version cross carrier interleaving in accordance with aspects of the present disclosure.

FIG. 8 shows a diagram of a system 800 including a device 805 that supports redundancy version cross carrier interleaving in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting redundancy version cross carrier interleaving). For example, the device 805 or a component of the device 805 may include a processor 840 and memory 830 coupled to the processor 840, the processor 840 and memory 830 configured to perform various functions described herein.

The communications manager 820 may support wireless communications at a wireless device in accordance with examples as disclosed herein. For example, the communications manager 820 may be configured as or otherwise support a means for identifying a TBS for a TB that is scheduled across a set of CCs including a first CC and a second CC, the TB including a first CB and a second CB. The communications manager 820 may be configured as or otherwise support a means for rate-matching the TB with the set of CCs. The communications manager 820 may be configured as or otherwise support a means for identifying a first set of redundancy portions of the first CB and a second set of redundancy portions of the second CB based on rate-matching the TB. The communications manager 820 may be configured as or otherwise support a means for allocating a first redundancy portion of the first CB to the first CC and a second redundancy portion of the first CB to the second CC. The communications manager 820 may be configured as or otherwise support a means for allocating a first redundancy portion of the second CB to the first CC and a second redundancy portion of the second CB to the second CC. The communications manager 820 may be configured as or otherwise support a means for transmitting the TB over the set of CCs based on allocating various redundancy portions of the first CB and the second CB to various CCs.

By including or configuring the communications manager 820 in accordance with examples as described herein, the device 805 may support techniques for improving communication reliability. For example, by interleaving redundancy versions of CBs across CCs, the communications manager 820 may support increased frequency diversity, providing improved reliability for transmissions of a TB. Improved communication reliability may reduce the latency involved in successfully receiving and decoding a message. Additionally, improving communication reliability may reduce a total number of retransmissions performed in a wireless communications system, effectively reducing the channel overhead.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of redundancy version cross carrier interleaving as described herein, or the processor 840 and the memory 830 may be otherwise configured to perform or support such operations.

Figure 9:
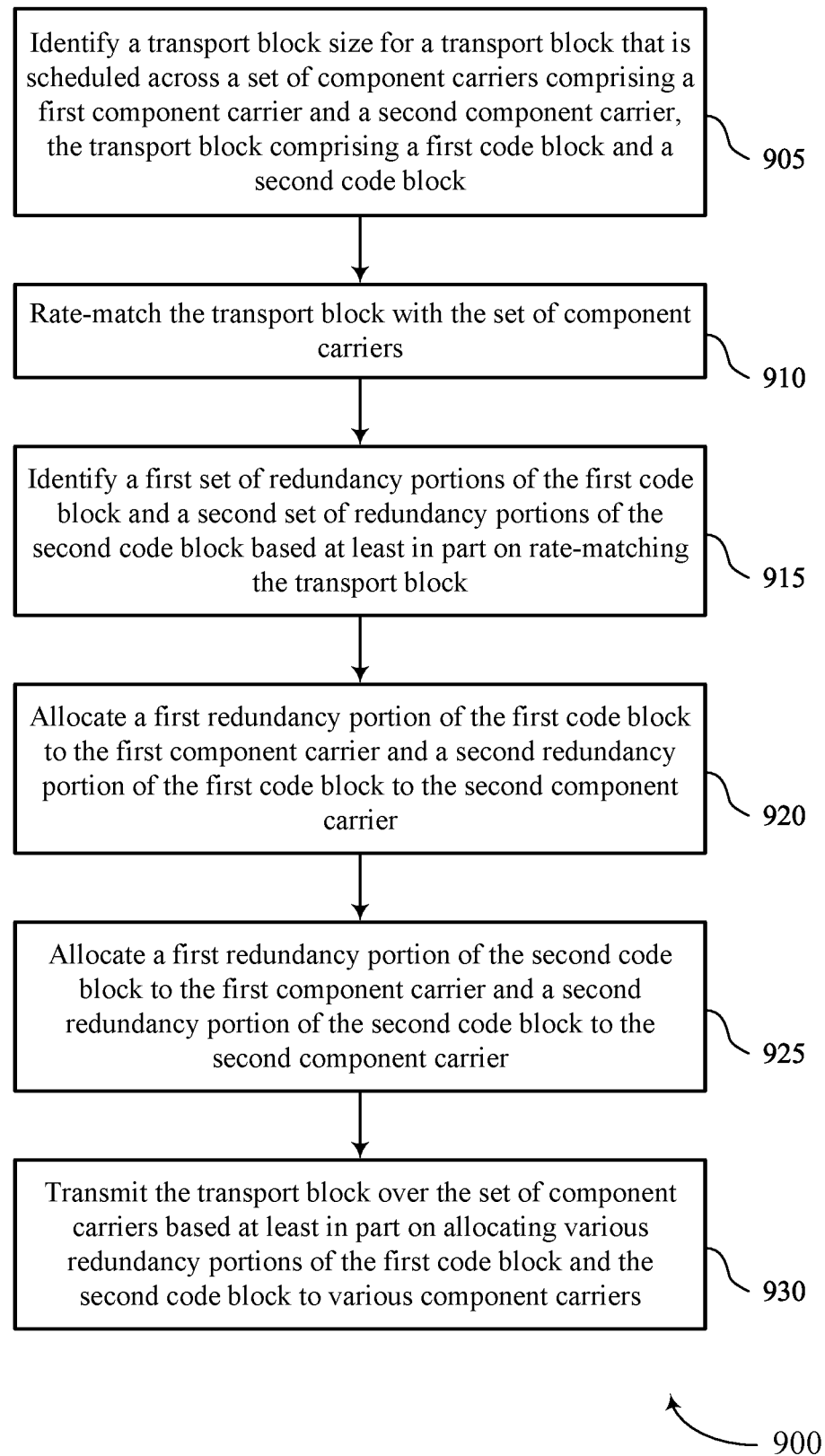
FIG. 9 shows a flowchart illustrating a method that supports redundancy version cross carrier interleaving in accordance with aspects of the present disclosure.

FIG. 9 shows a flowchart illustrating a method 900 that supports redundancy version cross carrier interleaving in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying a TBS for a TB that is scheduled across a set of CCs including a first CC and a second CC, the TB including a first CB and a second CB. The operations of 905 may be performed in accordance with examples as disclosed herein. In some examples, aspects of the operations of 905 may be performed by a TBS component 725 as described with reference to FIG. 7.

At 910, the method may include rate-matching the TB with the set of CCs. The operations of 910 may be performed in accordance with examples as disclosed herein. In some examples, aspects of the operations of 910 may be performed by a rate-matching component 730 as described with reference to FIG. 7.

At 915, the method may include identifying a first set of redundancy portions of the first CB and a second set of redundancy portions of the second CB based on rate-matching the TB. The operations of 915 may be performed in accordance with examples as disclosed herein. In some examples, aspects of the operations of 915 may be performed by a redundancy portion component 735 as described with reference to FIG. 7.

At 920, the method may include allocating a first redundancy portion of the first CB to the first CC and a second redundancy portion of the first CB to the second CC. The operations of 920 may be performed in accordance with examples as disclosed herein. In some examples, aspects of the operations of 920 may be performed by an allocation component 740 as described with reference to FIG. 7.

At 925, the method may include allocating a first redundancy portion of the second CB to the first CC and a second redundancy portion of the second CB to the second CC. The operations of 925 may be performed in accordance with examples as disclosed herein. In some examples, aspects of the operations of 925 may be performed by an allocation component 740 as described with reference to FIG. 7.

At 930, the method may include transmitting the TB over the set of CCs based on allocating various redundancy portions of the first CB and the second CB to various CCs. The operations of 930 may be performed in accordance with examples as disclosed herein. In some examples, aspects of the operations of 930 may be performed by a TBS transmitter 745 as described with reference to FIG. 7.

The following provides an overview of aspects of the present disclosure:

Aspect 1: A method for wireless communications at a wireless device, comprising: identifying a TBS for a TB that is scheduled across a set of CCs comprising a first CC and a second CC, the TB comprising a first CB and a second CB; rate-matching the TB with the set of CCs; identifying a first set of redundancy portions of the first CB and a second set of redundancy portions of the second CB based at least in part on rate-matching the TB; allocating a first redundancy portion of the first CB to the first CC and a second redundancy portion of the first CB to the second CC; allocating a first redundancy portion of the second CB to the first CC and a second redundancy portion of the second CB to the second CC; and transmitting the TB over the set of CCs based at least in part on allocating various redundancy portions of the first CB and the second CB to various CCs.

Aspect 2: The method of aspect 1, further comprising: identifying, for the first CC, a first quantity of bits allocated to the first CB and a second quantity of bits allocated to the second CB based at least in part on a quantity of CBs of the TB and a quantity of available bits of the first CC; and identifying, for the second CC, a third quantity of bits allocated to the first CB and a fourth quantity of bits allocated to the second CB based at least in part on the quantity of CBs of the TB, the quantity of available bits of the first CC, and the quantity of available bits of the second CC, wherein identifying the first set of redundancy portions of the first CB and the second set of redundancy portions of the second CB is based at least in part on identifying the first quantity of bits, the second quantity of bits, the third quantity of bits, and the fourth quantity of bits.

Aspect 3: The method of aspect 2, wherein the first redundancy portion of the first CB is based at least in part on the first quantity of bits of the first CC allocated to the first CB; the first redundancy portion of the second CB is based at least in part on the second quantity of bits of the first CC allocated to the second CB; the second redundancy portion of the first CB is based at least in part on the third quantity of bits of the second CC allocated to the first CB; and the second redundancy portion of the second CB is based at least in part on the fourth quantity of bits of the second CC allocated to the second CB.

Aspect 4: The method of any of aspects 2 through 3, further comprising: identifying a first starting bit position for the first redundancy portion of the first CB, wherein allocating the first redundancy portion of the first CB to the first CC is based at least in part on the first starting bit position and the first quantity of bits of the first CC allocated to the first CB; and identifying a second starting bit position for the second redundancy version of the first CB based at least in part on the first starting bit position of the first redundancy portion of the first CB and the first quantity of bits of the first CC allocated to the first CB, wherein allocating the second redundancy portion of the first CB to the second CC is based at least in part on the second starting bit position and the third quantity of bits of the second CC allocated to the first CB.

Aspect 5: The method of aspect 4, further comprising: identifying a third starting bit position for the first redundancy portion of the second CB, wherein allocating the first redundancy portion of the second CB to the first CC is based at least in part on the third starting bit position and the second quantity of bits of the first CC allocated to the second CB; and identifying a fourth starting bit position for the second redundancy portion of the second CB based at least in part on the third starting bit position of the first redundancy portion of the second CB and the second quantity of bits of the first CC allocated to the second CB, wherein allocating the second redundancy portion of the second CB to the second CC is based at least in part on the fourth starting bit position and the fourth quantity of bits of the second CC allocated to the second CB.

Aspect 6: The method of any of aspects 1 through 5, further comprising: identifying a first starting bit position for the second redundancy portion of the first CB allocated to the second CC; and identifying a second starting bit position for the second redundancy version of the second CB allocated to the second CC, wherein an index value of the first starting bit position is different than an index value of the second starting bit position, wherein allocating the second redundancy portion of the first CB and the second redundancy portion of the second CB to the second CC is based at least in part on the first starting bit position and the second starting bit position.

Aspect 7: The method of any of aspects 1 through 6, further comprising: applying a rounding function to a first ending bit position for the first redundancy portion of the first CB allocated to the first CC, the rounding function associated with a lifting factor associated with the TB; identifying a first starting bit position for the second redundancy portion of the first CB allocated to the second CC based at least in part on applying the rounding function to the first ending bit position for the first redundancy portion of the first CB allocated to the first CC; applying the rounding function to a second ending bit position for the first redundancy portion of the second CB allocated to the first CC, the rounding function associated with the lifting factor associated with the TB; and identifying a second starting bit position for the second redundancy version of the second CB allocated to the second CC based at least in part on applying the rounding function to the second ending bit position for the first redundancy portion of the second CB allocated to the first CC, wherein allocating the second redundancy portion of the first CB and the second redundancy portion of the second CB to the second CC is based at least in part on the first starting bit position and the second starting bit position.

Aspect 8: The method of any of aspects 1 through 7, further comprising: identifying a first adjustment factor for the first CC; identifying, for the first CC, a first quantity of bits allocated to the first CB and a second quantity of bits allocated to the second CB based at least in part on the first adjustment factor; identifying a second adjustment factor for the second CC; and identifying, for the second CC, a third quantity of bits allocated to the first CB and a fourth quantity of bits allocated to the second CB based at least in part on the second adjustment factor, wherein allocating redundancy portions to the first CC and the second CC are based at least in part on the identifying the first quantity of bits, the second quantity of bits, the third quantity of bits, and the fourth quantity of bits.

Aspect 9: The method of any of aspects 1 through 8, wherein allocating redundancy portions to the first CC further comprises allocating a first quantity of bits of the first CC to the first redundancy portion of the first CB before allocating a second quantity of bits of the first CC to the first redundancy portion of the second CB, the method further comprising: adjusting a starting CB for the second CC based at least in part on allocating the first redundancy portion of the first CB before allocating the first redundancy portion of the second CB to the first CC, wherein allocating redundancy portions to the second CC further comprises allocating a third quantity of bits of the second CC to the second redundancy portion of the second CB before allocating a fourth quantity of bits of the second CC the second redundancy portion of the first CB.

Aspect 10: The method of any of aspects 1 through 9, further comprising: estimating a quantity of resource elements associated with the first CC based at least in part on the TBS; identifying a first starting bit position for the second redundancy portion of the first CB allocated to the second CC based at least in part on the quantity of resource elements; and identifying a second starting bit position for the second redundancy portion of the second CB allocated to the second CC based at least in part on the quantity of resource elements, wherein allocating the second redundancy portion of the first CB and the second redundancy portion of the second CB to the second CC is based at least in part on the first starting bit position and the second starting bit position.

Aspect 11: The method of aspect 10, wherein a quantity of resource elements associated with each CC of the set of CCs is equal.

Aspect 12: The method of any of aspects 10 through 11, wherein the first starting bit position and the second starting bit position are the same and are identified based at least in part on a quantity of bits per CB of the set of CBs.

Aspect 13: The method of any of aspects 1 through 12, wherein identifying the TBS is based at least in part on a respective modulation order, quantity of layers, quantity of resource elements, and coding rate for each CC of the set of CCs.

Aspect 14: The method of any of aspects 1 through 13, wherein identifying the TBS is based at least in part on a respective maximum modulation order, maximum quantity of layers, quantity of resource elements, and coding rate for each CC of a plurality of CCs comprising the set of CCs and a quantity of configured CCs.

Aspect 15: The method of any of aspects 1 through 14, wherein a quantity of bits in a redundancy portion is based at least in part on a quantity of CCs of the set of CCs and a quantity of CBs of the TB.

Aspect 16: The method of any of aspects 1 through 15, further comprising: ordering each CC of the set of CCs based at least in part on a respective CC index, a respective modulation order, or a combination thereof, wherein allocating redundancy portions to the set of CCs is based at least in part on the ordering.

Aspect 17: An apparatus for wireless communications at a wireless device, comprising a processor; memory coupled with the processor; and instructions stored in the memory and executable by the processor to cause the apparatus to perform a method of any of aspects 1 through 16.

Aspect 18: An apparatus for wireless communications at a wireless device, comprising at least one means for performing a method of any of aspects 1 through 16.

Aspect 19: A non-transitory computer-readable medium storing code for wireless communications at a wireless device, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless device, comprising:
    identifying a transport block size for a transport block that is scheduled across a set of component carriers comprising a first component carrier and a second component carrier, the transport block comprising a first code block and a second code block;
    rate-matching the transport block with the set of component carriers;
    identifying a first set of redundancy portions of the first code block and a second set of redundancy portions of the second code block based at least in part on rate-matching the transport block, wherein the first set of redundancy portions and the second set of redundancy portions are stored in a circular buffer;
    allocating a first redundancy portion of the first code block to the first component carrier and a second redundancy portion of the first code block to the second component carrier;
    allocating a first redundancy portion of the second code block to the first component carrier and a second redundancy portion of the second code block to the second component carrier; and
    transmitting the transport block over the set of component carriers based at least in part on allocating various redundancy portions of the first code block and the second code block to various component carriers.

2. The method of claim 1, further comprising:
    identifying, for the first component carrier, a first quantity of bits allocated to the first code block and a second quantity of bits allocated to the second code block based at least in part on a quantity of code blocks of the transport block and a quantity of available bits of the first component carrier; and identifying, for the second component carrier, a third quantity of bits allocated to the first code block and a fourth quantity of bits allocated to the second code block based at least in part on the quantity of code blocks of the transport block, the quantity of available bits of the first component carrier, and the quantity of available bits of the second component carrier, wherein identifying the first set of redundancy portions of the first code block and the second set of redundancy portions of the second code block is based at least in part on identifying the first quantity of bits, the second quantity of bits, the third quantity of bits, and the fourth quantity of bits.

3. The method of claim 2, wherein:

the first redundancy portion of the first code block is based at least in part on the first quantity of bits of the first component carrier allocated to the first code block;

the first redundancy portion of the second code block is based at least in part on the second quantity of bits of the first component carrier allocated to the second code block;

the second redundancy portion of the first code block is based at least in part on the third quantity of bits of the second component carrier allocated to the first code block; and the second redundancy portion of the second code block is based at least in part on the fourth quantity of bits of the second component carrier allocated to the second code block.

4. The method of claim 2, further comprising:

identifying a first starting bit position for the first redundancy portion of the first code block, wherein allocating the first redundancy portion of the first code block to the first component carrier is based at least in part on the first starting bit position and the first quantity of bits of the first component carrier allocated to the first code block; and identifying a second starting bit position for the second redundancy portion of the first code block based at least in part on the first starting bit position of the first redundancy portion of the first code block and the first quantity of bits of the first component carrier allocated to the first code block, wherein allocating the second redundancy portion of the first code block to the second component carrier is based at least in part on the second starting bit position and the third quantity of bits of the second component carrier allocated to the first code block.

5. The method of claim 4, further comprising:

identifying a third starting bit position for the first redundancy portion of the second code block, wherein allocating the first redundancy portion of the second code block to the first component carrier is based at least in part on the third starting bit position and the second quantity of bits of the first component carrier allocated to the second code block; and identifying a fourth starting bit position for the second redundancy portion of the second code block based at least in part on the third starting bit position of the first redundancy portion of the second code block and the second quantity of bits of the first component carrier allocated to the second code block, wherein allocating the second redundancy portion of the second code block to the second component carrier is based at least in part on the fourth starting bit position and the fourth quantity of bits of the second component carrier allocated to the second code block.

6. The method of claim 1, further comprising:

identifying a first starting bit position for the second redundancy portion of the first code block allocated to the second component carrier; and identifying a second starting bit position for the second redundancy portion of the second code block allocated to the second component carrier, wherein an index value of the first starting bit position is different than an index value of the second starting bit position, wherein allocating the second redundancy portion of the first code block and the second redundancy portion of the second code block to the second component carrier is based at least in part on the first starting bit position and the second starting bit position.

7. The method of claim 1, further comprising:

applying a rounding function to a first ending bit position for the first redundancy portion of the first code block allocated to the first component carrier, the rounding function associated with a lifting factor associated with the transport block;

identifying a first starting bit position for the second redundancy portion of the first code block allocated to the second component carrier based at least in part on applying the rounding function to the first ending bit position for the first redundancy portion of the first code block allocated to the first component carrier;

applying the rounding function to a second ending bit position for the first redundancy portion of the second code block allocated to the first component carrier, the rounding function associated with the lifting factor associated with the transport block; and identifying a second starting bit position for the second redundancy portion of the second code block allocated to the second component carrier based at least in part on applying the rounding function to the second ending bit position for the first redundancy portion of the second code block allocated to the first component carrier, wherein allocating the second redundancy portion of the first code block and the second redundancy portion of the second code block to the second component carrier is based at least in part on the first starting bit position and the second starting bit position.

8. The method of claim 1, further comprising:

identifying a first adjustment factor for the first component carrier;

identifying, for the first component carrier, a first quantity of bits allocated to the first code block and a second quantity of bits allocated to the second code block based at least in part on the first adjustment factor;

identifying a second adjustment factor for the second component carrier; and identifying, for the second component carrier, a third quantity of bits allocated to the first code block and a fourth quantity of bits allocated to the second code block based at least in part on the second adjustment factor, wherein allocating redundancy portions to the first component carrier and the second component carrier are based at least in part on the identifying the first quantity of bits, the second quantity of bits, the third quantity of bits, and the fourth quantity of bits.

9. The method of claim 1, wherein allocating redundancy portions to the first component carrier further comprises allocating a first quantity of bits of the first component carrier to the first redundancy portion of the first code block before allocating a second quantity of bits of the first component carrier to the first redundancy portion of the second code block, the method further comprising:

adjusting a starting code block for the second component carrier based at least in part on allocating the first redundancy portion of the first code block before allocating the first redundancy portion of the second code block to the first component carrier, wherein allocating redundancy portions to the second component carrier further comprises allocating a third quantity of bits of the second component carrier to the second redundancy portion of the second code block before allocating a fourth quantity of bits of the second component carrier the second redundancy portion of the first code block.

10. The method of claim 1, further comprising:

estimating a quantity of resource elements associated with the first component carrier based at least in part on the transport block size;

identifying a first starting bit position for the second redundancy portion of the first code block allocated to the second component carrier based at least in part on the quantity of resource elements; and identifying a second starting bit position for the second redundancy portion of the second code block allocated to the second component carrier based at least in part on the quantity of resource elements, wherein allocating the second redundancy portion of the first code block and the second redundancy portion of the second code block to the second component carrier is based at least in part on the first starting bit position and the second starting bit position.

11. The method of claim 10, wherein a quantity of resource elements associated with each component carrier of the set of component carriers is equal.

12. The method of claim 10, wherein the first starting bit position and the second starting bit position are the same and are identified based at least in part on a quantity of bits per code block of a set of code blocks.

13. The method of claim 1, wherein identifying the transport block size is based at least in part on a respective modulation order, quantity of layers, quantity of resource elements, and coding rate for each component carrier of the set of component carriers.

14. The method of claim 1, wherein identifying the transport block size is based at least in part on a respective maximum modulation order, maximum quantity of layers, quantity of resource elements, and coding rate for each component carrier of a plurality of component carriers comprising the set of component carriers and a quantity of configured component carriers.

15. The method of claim 1, wherein a quantity of bits in a redundancy portion is based at least in part on a quantity of component carriers of the set of component carriers and a quantity of code blocks of the transport block.

16. The method of claim 1, further comprising:

ordering each component carrier of the set of component carriers based at least in part on a respective component carrier index, a respective modulation order, or a combination thereof, wherein allocating redundancy portions to the set of component carriers is based at least in part on the ordering.

17. An apparatus for wireless communications at a wireless device, comprising:
a processor;
memory coupled with the processor; and
instructions stored in the memory and executable by the processor to cause the apparatus to:
identify a transport block size for a transport block that is scheduled across a set of component carriers comprising a first component carrier and a second component carrier, the transport block comprising a first code block and a second code block;
rate-match the transport block with the set of component carriers;
identify a first set of redundancy portions of the first code block and a second set of redundancy portions of the second code block based at least in part on rate-matching the transport block;
store the first set of redundancy portions and the second set of redundancy portions in a circular buffer;
allocate a first redundancy portion of the first code block to the first component carrier and a second redundancy portion of the first code block to the second component carrier;
allocate a first redundancy portion of the second code block to the first component carrier and a second redundancy portion of the second code block to the second component carrier; and
transmit the transport block over the set of component carriers based at least in part on allocating various redundancy portions of the first code block and the second code block to various component carriers.

18. The apparatus of claim 17, wherein the instructions are further executable by the processor to cause the apparatus to:

identify, for the first component carrier, a first quantity of bits allocated to the first code block and a second quantity of bits allocated to the second code block based at least in part on a quantity of code blocks of the transport block and a quantity of available bits of the first component carrier; and identify, for the second component carrier, a third quantity of bits allocated to the first code block and a fourth quantity of bits allocated to the second code block based at least in part on the quantity of code blocks of the transport block, the quantity of available bits of the first component carrier, and the quantity of available bits of the second component carrier, wherein identifying the first set of redundancy portions of the first code block and the second set of redundancy portions of the second code block is based at least in part on identifying the first quantity of bits, the second quantity of bits, the third quantity of bits, and the fourth quantity of bits.

19. The apparatus of claim 18, wherein:

the first redundancy portion of the first code block is based at least in part on the first quantity of bits of the first component carrier allocated to the first code block;

the first redundancy portion of the second code block is based at least in part on the second quantity of bits of the first component carrier allocated to the second code block;

the second redundancy portion of the first code block is based at least in part on the third quantity of bits of the second component carrier allocated to the first code block; and the second redundancy portion of the second code block is based at least in part on the fourth quantity of bits of the second component carrier allocated to the second code block.

20. The apparatus of claim 18, wherein the instructions are further executable by the processor to cause the apparatus to:
- identify a first starting bit position for the first redundancy portion of the first code block, wherein allocating the first redundancy portion of the first code block to the first component carrier is based at least in part on the first starting bit position and the first quantity of bits of the first component carrier allocated to the first code block; and
- identify a second starting bit position for the second redundancy portion of the first code block based at least in part on the first starting bit position of the first redundancy portion of the first code block and the first quantity of bits of the first component carrier allocated to the first code block, wherein allocating the second redundancy portion of the first code block to the second component carrier is based at least in part on the second starting bit position and the third quantity of bits of the second component carrier allocated to the first code block.

21. The apparatus of claim 20, wherein the instructions are further executable by the processor to cause the apparatus to:
- identify a third starting bit position for the first redundancy portion of the second code block, wherein allocating the first redundancy portion of the second code block to the first component carrier is based at least in part on the third starting bit position and the second quantity of bits of the first component carrier allocated to the second code block; and
- identify a fourth starting bit position for the second redundancy portion of the second code block based at least in part on the third starting bit position of the first redundancy portion of the second code block and the second quantity of bits of the first component carrier allocated to the second code block, wherein allocating the second redundancy portion of the second code block to the second component carrier is based at least in part on the fourth starting bit position and the fourth quantity of bits of the second component carrier allocated to the second code block.

22. The apparatus of claim 17, wherein the instructions are further executable by the processor to cause the apparatus to:
- identify a first starting bit position for the second redundancy portion of the first code block allocated to the second component carrier; and
- identify a second starting bit position for the second redundancy portion of the second code block allocated to the second component carrier, wherein an index value of the first starting bit position is different than an index value of the second starting bit position, wherein allocating the second redundancy portion of the first code block and the second redundancy portion of the second code block to the second component carrier is based at least in part on the first starting bit position and the second starting bit position.

23. The apparatus of claim 17, wherein the instructions are further executable by the processor to cause the apparatus to:
- apply a rounding function to a first ending bit position for the first redundancy portion of the first code block allocated to the first component carrier, the rounding function associated with a lifting factor associated with the transport block;
- identify a first starting bit position for the second redundancy portion of the first code block allocated to the second component carrier based at least in part on applying the rounding function to the first ending bit position for the first redundancy portion of the first code block allocated to the first component carrier;
- apply the rounding function to a second ending bit position for the first redundancy portion of the second code block allocated to the first component carrier, the rounding function associated with the lifting factor associated with the transport block; and
- identify a second starting bit position for the second redundancy portion of the second code block allocated to the second component carrier based at least in part on applying the rounding function to the second ending bit position for the first redundancy portion of the second code block allocated to the first component carrier, wherein allocating the second redundancy portion of the first code block and the second redundancy portion of the second code block to the second component carrier is based at least in part on the first starting bit position and the second starting bit position.

24. The apparatus of claim 17, wherein the instructions are further executable by the processor to cause the apparatus to:
- identify a first adjustment factor for the first component carrier;
- identify, for the first component carrier, a first quantity of bits allocated to the first code block and a second quantity of bits allocated to the second code block based at least in part on the first adjustment factor;
- identify a second adjustment factor for the second component carrier; and
- identify, for the second component carrier, a third quantity of bits allocated to the first code block and a fourth quantity of bits allocated to the second code block based at least in part on the second adjustment factor, wherein allocating redundancy portions to the first component carrier and the second component carrier are based at least in part on the identifying the first quantity of bits, the second quantity of bits, the third quantity of bits, and the fourth quantity of bits.

25. The apparatus of claim 17, wherein allocating redundancy portions to the first component carrier further comprises allocating a first quantity of bits of the first component carrier to the first redundancy portion of the first code block before allocating a second quantity of bits of the first component carrier to the first redundancy portion of the second code block, and the instructions are further executable by the processor to cause the apparatus to:
- adjust a starting code block for the second component carrier based at least in part on allocating the first redundancy portion of the first code block before allocating the first redundancy portion of the second code block to the first component carrier, wherein allocating redundancy portions to the second component carrier further comprises allocating a third quantity of bits of the second component carrier to the second redundancy portion of the second code block before allocating a fourth quantity of bits of the second component carrier the second redundancy portion of the first code block.

26. The apparatus of claim 17, wherein the instructions are further executable by the processor to cause the apparatus to:

estimate a quantity of resource elements associated with the first component carrier based at least in part on the transport block size;

identify a first starting bit position for the second redundancy portion of the first code block allocated to the second component carrier based at least in part on the quantity of resource elements; and identify a second starting bit position for the second redundancy portion of the second code block allocated to the second component carrier based at least in part on the quantity of resource elements, wherein allocating the second redundancy portion of the first code block and the second redundancy portion of the second code block to the second component carrier is based at least in part on the first starting bit position and the second starting bit position.

27. The apparatus of claim 26, wherein a quantity of resource elements associated with each component carrier of the set of component carriers is equal.

28. The apparatus of claim 26, wherein the first starting bit position and the second starting bit position are the same and are identified based at least in part on a quantity of bits per code block of a set of code blocks.

29. An apparatus for wireless communications at a wireless device, comprising:

means for identifying a transport block size for a transport block that is scheduled across a set of component carriers comprising a first component carrier and a second component carrier, the transport block comprising a first code block and a second code block;

means for rate-matching the transport block with the set of component carriers;

means for identifying a first set of redundancy portions of the first code block and a second set of redundancy portions of the second code block based at least in part on rate-matching the transport block;

means for storing the first set of redundancy portions and the second set of redundancy portions in a circular buffer;

means for allocating a first redundancy portion of the first code block to the first component carrier and a second redundancy portion of the first code block to the second component carrier;

means for allocating a first redundancy portion of the second code block to the first component carrier and a second redundancy portion of the second code block to the second component carrier; and means for transmitting the transport block over the set of component carriers based at least in part on allocating various redundancy portions of the first code block and the second code block to various component carriers.

30. A non-transitory computer-readable medium storing code for wireless communications at a wireless device, the code comprising instructions executable by a processor to:

identify a transport block size for a transport block that is scheduled across a set of component carriers comprising a first component carrier and a second component carrier, the transport block comprising a first code block and a second code block;

rate-match the transport block with the set of component carriers;

identify a first set of redundancy portions of the first code block and a second set of redundancy portions of the second code block based at least in part on rate-matching the transport block;

store the first set of redundancy portions and the second set of redundancy portions are stored in a circular buffer;

allocate a first redundancy portion of the first code block to the first component carrier and a second redundancy portion of the first code block to the second component carrier;

allocate a first redundancy portion of the second code block to the first component carrier and a second redundancy portion of the second code block to the second component carrier; and transmit the transport block over the set of component carriers based at least in part on allocating various redundancy portions of the first code block and the second code block to various component carriers.

* * * * *